US011904449B2

(12) United States Patent
Machida et al.

(10) Patent No.: US 11,904,449 B2
(45) Date of Patent: Feb. 20, 2024

(54) WORK TOOL

(71) Applicant: MAKITA CORPORATION, Anjo (JP)

(72) Inventors: Yoshitaka Machida, Anjo (JP); Taro Hisano, Anjo (JP)

(73) Assignee: MAKITA CORPORATION, Anjo (JP)

( * ) Notice: Subject to any disclaimer, the term of this patent is extended or adjusted under 35 U.S.C. 154(b) by 64 days.

(21) Appl. No.: 17/366,159

(22) Filed: Jul. 2, 2021

(65) Prior Publication Data

US 2021/0331304 A1 Oct. 28, 2021

Related U.S. Application Data

(62) Division of application No. 16/564,103, filed on Sep. 9, 2019, now Pat. No. 11,084,158.

(30) Foreign Application Priority Data

Sep. 10, 2018 (JP) ................................ 2018-169241
Sep. 10, 2018 (JP) ................................ 2018-169242
Jun. 19, 2019 (JP) ................................ 2019-114096

(51) Int. Cl.
*B25D 17/24* (2006.01)
*B25D 16/00* (2006.01)

(52) U.S. Cl.
CPC ........... *B25D 17/24* (2013.01); *B25D 16/006* (2013.01); *B25D 2216/0084* (2013.01);
(Continued)

(58) Field of Classification Search
CPC .................. B25D 17/24; B25D 16/006; B25D 2216/0084; B25D 2250/121;
(Continued)

(56) References Cited

U.S. PATENT DOCUMENTS 5,914,882 A 6/1999 Yeghiazarians
7,523,790 B2 4/2009 Arakawa et al.
(Continued)

FOREIGN PATENT DOCUMENTS

CN 1792567 A 6/2006
CN 102069484 A 5/2011
(Continued)

OTHER PUBLICATIONS

Apr. 19, 2021 Notice of Allowance issued in U.S. Appl. No. 16/564,103.

(Continued)

*Primary Examiner* — Anna K Kinsaul
*Assistant Examiner* — Himchan Song
(74) *Attorney, Agent, or Firm* — Oliff PLC

(57) ABSTRACT

A work tool includes a motor, a driving mechanism, a body housing and a handle. The driving mechanism is configured to perform an operation of linearly reciprocating the tool accessory along a driving axis extending in a front-rear direction. The handle includes a grip part extending substantially in an up-down direction, and a battery-mounting part provided on a lower side of the grip part. An upper end portion of the handle is connected to a rear end portion of the body housing via an elastic member so as to be movable relative to the body housing. A lower end portion of the handle is connected to the rear end portion of the body housing so as to be rotatable relative to the body housing, around a rotation axis extending in a left-right direction. The rotation axis is located on a lower side of the battery-mounting part.

16 Claims, 10 Drawing Sheets

(52) U.S. Cl.
CPC .. *B25D 2250/121* (2013.01); *B25D 2250/201* (2013.01); *B25D 2250/221* (2013.01); *B25D 2250/265* (2013.01); *B25D 2250/371* (2013.01)

(58) Field of Classification Search
CPC ........ B25D 2250/201; B25D 2250/221; B25D 2250/265; B25D 2250/371
See application file for complete search history.

(56) References Cited

U.S. PATENT DOCUMENTS

| | | | |
|---|---|---|---|
| 2004/0177981 | A1 | 9/2004 | Berger |
| 2006/0156859 | A1 | 7/2006 | Nemetz |
| 2008/0210451 | A1 | 9/2008 | Aoki |
| 2009/0188691 | A1 | 7/2009 | Hahn |
| 2011/0114347 | A1* | 5/2011 | Kasuya ..................... B25F 5/00 173/2 |
| 2012/0067605 | A1 | 3/2012 | Furusawa et al. |
| 2016/0151845 | A1 | 6/2016 | Yamamoto et al. |
| 2016/0207187 | A1 | 7/2016 | Nishikawa et al. |
| 2016/0279782 | A1 | 9/2016 | Ullrich et al. |
| 2016/0361809 | A1* | 12/2016 | Teranishi ............. B25D 17/043 |
| 2017/0368673 | A1 | 12/2017 | Kunz |
| 2018/0021931 | A1 | 1/2018 | Abe et al. |
| 2018/0099391 | A1 | 4/2018 | Umemoto et al. |
| 2018/0099394 | A1 | 4/2018 | Ichikawa et al. |

FOREIGN PATENT DOCUMENTS

| | | | |
|---|---|---|---|
| CN | 105983951 | A | 10/2016 |
| CN | 106239434 | A | 12/2016 |
| JP | 2005-502488 | A | 1/2005 |
| JP | 2006-095654 | A | 4/2006 |
| JP | 2007-222976 | A | 9/2007 |
| JP | 2011-104736 | A | 6/2011 |
| JP | 2015-024512 | A | 2/2015 |
| JP | 2018-058187 | A | 4/2018 |
| JP | 2018-058188 | A | 4/2018 |
| WO | 2015/029660 | A1 | 3/2015 |

OTHER PUBLICATIONS

Feb. 8, 2021 Office Action issued in U.S. Appl. No. 16/564,103.
Feb. 28, 2023 Office Action issued in Japanese Patent Application No. 2019-114096.
Jun. 29, 2023 Office Action issued in Chinese Patent Application No. 201910849054.8.

* cited by examiner

WORK TOOL

CROSS-REFERENCE TO RELATED APPLICATION

This is a Divisional Application of U.S. patent application Ser. No. 16/564,103 filed Sep. 9, 2019, which claims priority to Japanese patent application No. 2018-169241 filed on Sep. 10, 2018, Japanese patent application No. 2018-169242 filed on Sep. 10, 2018, and Japanese patent application No. 2019-114096 filed on Jun. 19, 2019. The contents of the foregoing applications are fully incorporated herein by reference.

TECHNICAL FIELD

The present invention relates to a work tool configured to linearly reciprocate a tool accessory.

BACKGROUND ART

A hand-held work tool (a so-called reciprocating tool) is known which performs an operation on a workpiece by linearly reciprocating a tool accessory along a specified driving axis by power of a motor. In the reciprocating tool, vibration is caused during the operation in a tool body which houses a driving mechanism. The vibration is caused mainly in a direction of the driving axis. Therefore, for example, U.S. Unexamined Patent Application Publication No. 2017/0368673 discloses a reciprocating tool (hammer drill) which includes a tool body and a handle whose upper end portion is connected to the tool body via a vibration damping mechanism.

SUMMARY

In the reciprocating tool having the above-described structure, further improvement may be desired to suppress transmission of vibration to a grip part.

It is, accordingly, an object of the present disclosure to provide a technique which may help suppress transmission of vibration to a grip part in a work tool which is configured to linearly reciprocate a tool accessory.

According to an aspect of the present disclosure, a work tool is provided which is configured to perform an operation by driving a tool accessory. This work tool includes a motor, a driving mechanism, a body housing and a handle. The driving mechanism is configured to perform an operation of linearly reciprocating the tool accessory along a driving axis by power of the motor. The driving axis extends in a front-rear direction of the work tool. The body housing houses the motor and the driving mechanism. The handle includes a grip part and a battery-mounting part. The grip part extends substantially in an up-down direction crossing the driving axis. The battery-mounting part is provided on a lower side of the grip part and configured to removably receive a battery. An upper end portion of the handle is connected to a rear end portion of the body housing via an elastic member so as to be movable relative to the body housing. A lower end portion of the handle is connected to the rear end portion of the body housing so as to be rotatable around a rotation axis relative to the body housing. The rotation axis extends in a left-right direction. The rotation axis is located on a lower side of the battery-mounting part.

According to another aspect of the present disclosure, a work tool is provided which is configured to perform an operation by driving a tool accessory. This work tool includes a motor, a driving mechanism, a body housing, a handle and a battery. The driving mechanism is configured to perform an operation of linearly reciprocating the tool accessory along a driving axis by power of the motor. The driving axis extends in a front-rear direction of the work tool. The body housing houses the motor and the driving mechanism. The handle includes a grip part and a battery-mounting part. The grip part extends substantially in an up-down direction crossing the driving axis. The battery-mounting part is provided on a lower side of the grip part. The battery is removably mounted to the battery-mounting part. An upper end portion of the handle is connected to a rear end portion of the body housing via an elastic member so as to be movable relative to the body housing. A lower end portion of the handle is connected to the rear end portion of the body housing so as to be rotatable around a rotation axis relative to the body housing. The rotation axis extends in a left-right direction. The rotation axis is located on a lower side of a center of gravity of the handle with the battery mounted thereto.

DETAILED DESCRIPTION OF THE EMBODIMENTS

An embodiment is now described with reference to the drawings. In the following embodiment, a hammer drill 1 is described as an example of a work tool which is configured to perform an operation by linearly driving a tool accessory 91. The hammer drill 1 is configured to perform an operation (hereinafter referred to as a hammering operation) of linearly reciprocating the tool accessory 91 coupled to a tool holder 39 along a specified driving axis A1, and an operation (hereinafter referred to as a drilling operation) of rotationally driving the tool accessory 91 around the driving axis A1.

Figure 1:
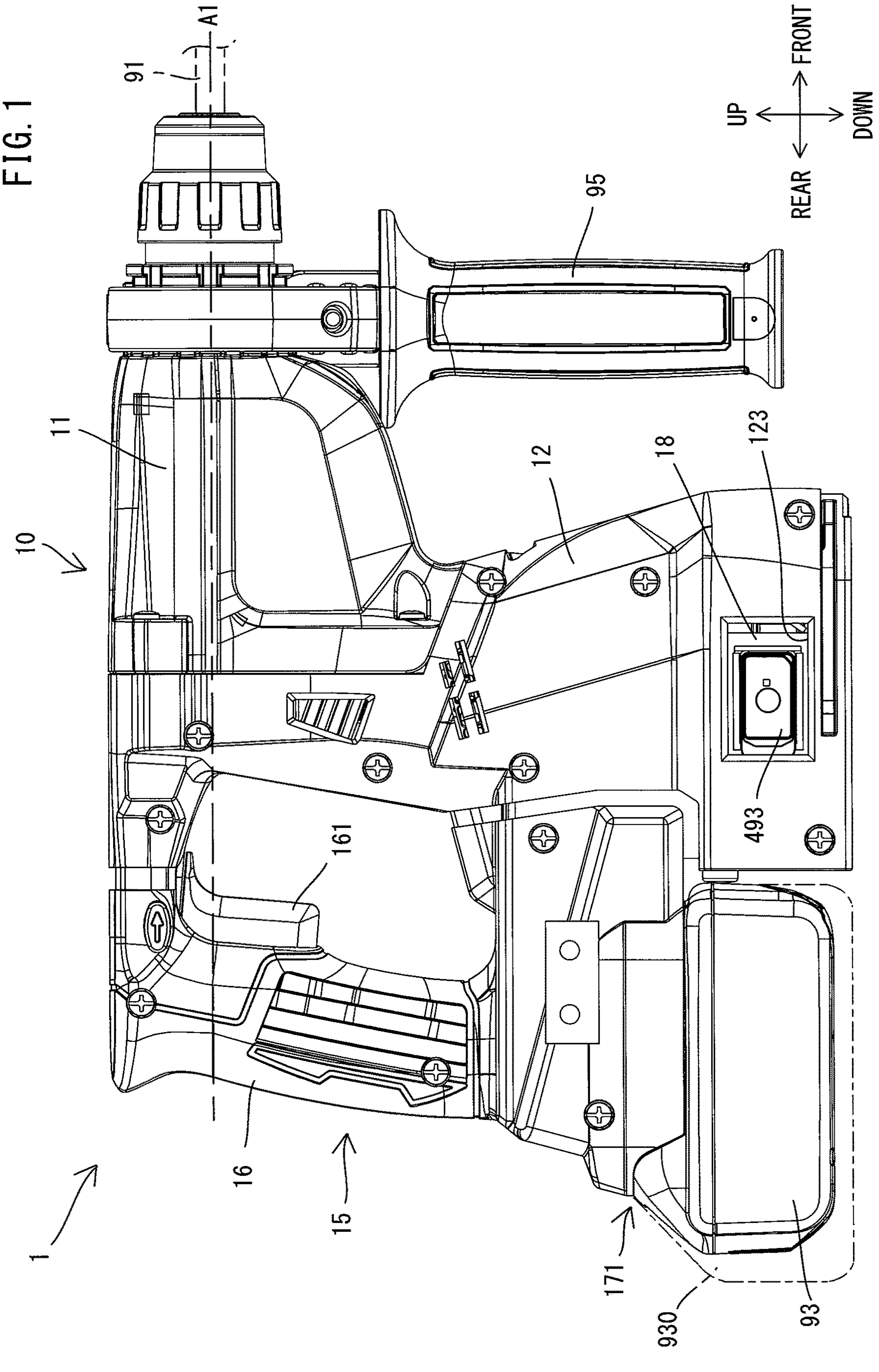
FIG. 1 is a right side view of a hammer drill.
Figure 2:
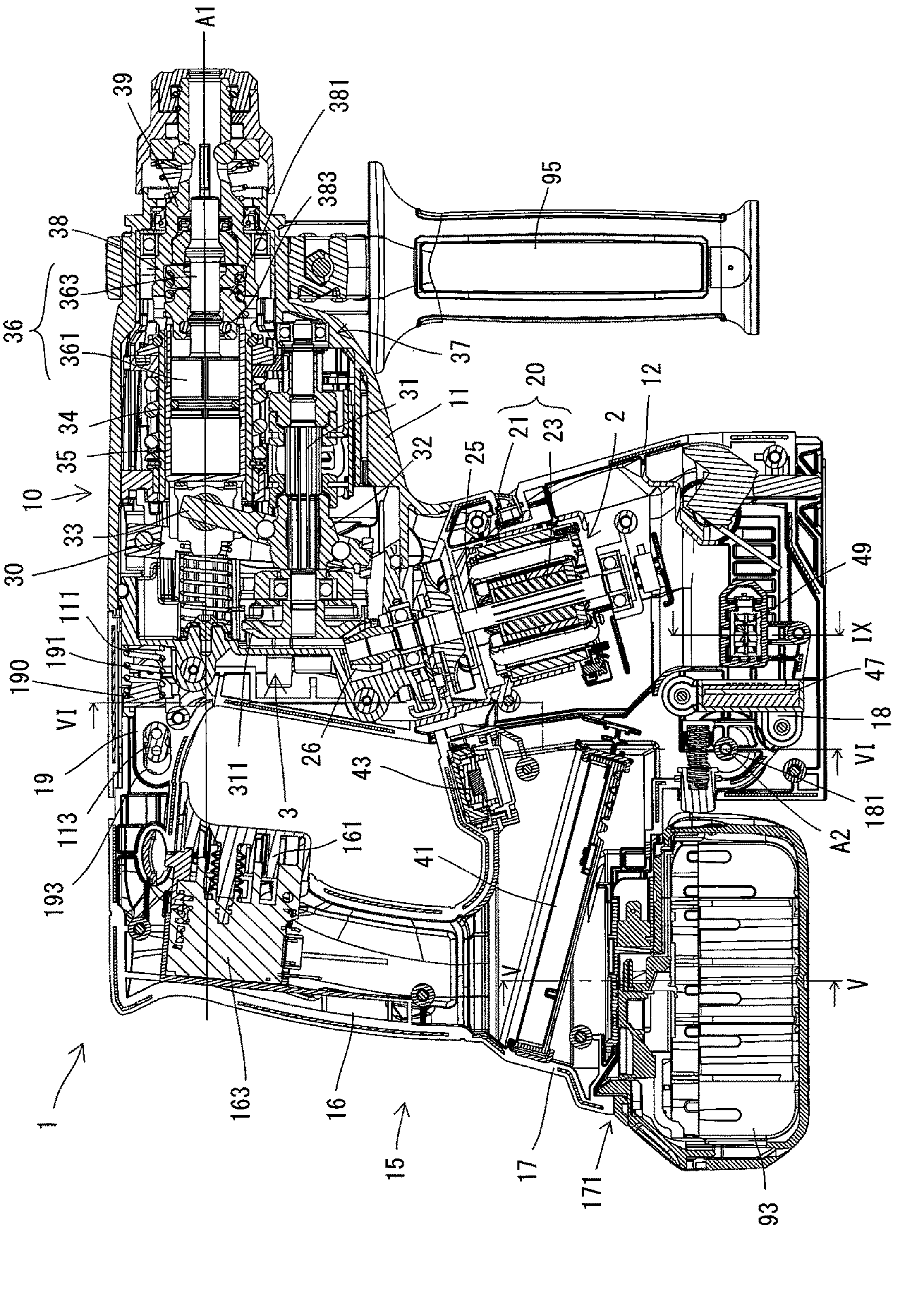
FIG. 2 is a sectional view of the hammer drill.

First, the general structure of the hammer drill 1 is described. As shown in FIGS. 1 and 2, an outer shell of the hammer drill 1 is mainly formed by a body housing 10 and a handle 15.

The body housing 10 mainly includes a driving-mechanism-housing part 11 which houses a driving mechanism 3, and a motor-housing part 12 which houses a motor 2. The body housing 10 is generally L-shaped as a whole in a side view.

The driving-mechanism-housing part 11 has an elongate box-like shape and extends along the driving axis A1. A tool holder 39 is provided in one end portion of the driving-mechanism-housing part 11 in the driving-axis-A1 direction. The tool holder 39 is configured such that the tool accessory 91 is removably coupled thereto. The tool holder 39 is supported by the driving-mechanism-housing part 11 so as to be rotatable around the driving axis A1. Further, the tool holder 39 is configured to hold the tool accessory 91 such that the tool accessory 91 cannot rotate and can linearly move in the driving-axis-A1 direction. The one end portion of the driving-mechanism-housing part 11 in which the tool holder 39 is housed has a generally cylindrical shape. An auxiliary handle 95 may be removably mounted to an outer periphery of this cylindrical part.

The motor-housing part 12 is fixedly connected to the other end portion of the driving-mechanism-housing part 11 in the driving-axis-A1 direction so as to be immovable relative to the driving-mechanism-housing part 11. The motor-housing part 12 protrudes from the driving-mechanism-housing part 11 in a direction crossing the driving axis A1 and away from the driving axis A1. The motor 2 is disposed within the motor-housing part 12 such that a rotation axis of a motor shaft 25 extends in a direction crossing (specifically, oblique to) the driving axis A1.

In the following description, for convenience sake, an extending direction of the driving axis A1 is defined as a front-rear direction of the hammer drill 1. In the front-rear direction, one end side of the hammer drill 1 on which the tool holder 39 is disposed is defined as a front side (also referred to as a front-end-region side) of the hammer drill 1, and the opposite side is defined as a rear side. Further, a direction which is orthogonal to the driving axis A1 and which corresponds to an extending direction of the rotation axis of the motor shaft 25 is defined as an up-down direction of the hammer drill 1. In the up-down direction, a direction toward which the motor-housing part 12 protrudes from the driving-mechanism-housing part 11 is defined as a downward direction, and the opposite direction is defined as an upward direction. Further, a direction which is orthogonal to the front-rear direction and the up-down direction is defined as a left-right direction.

The handle 15 is generally C-shaped as a whole in a side view. Both end portions of the handle 15 are connected to the body housing 10. The handle 15 includes a grip part 16 to be held by a user. The grip part 16 is arranged to be spaced rearward apart from the body housing 10. The grip part 16 extends substantially in the up-down direction crossing the driving axis A1. A trigger 161, which can be depressed by a user, is provided in an upper front end portion of the grip part 16. A battery-mounting part 171 is provided on the lower side of the grip part 16. A rechargeable battery (battery pack) 93, which is used as a power source of the motor 2, may be removably mounted to the battery-mounting part 171. In the hammer drill 1, when the trigger 161 is depressed, the motor 2 is driven, so that the hammering operation and/or the drilling operation may be performed.

The structure of the hammer drill 1 is now described in detail.

First, the internal structure of the body housing 10 (the driving-mechanism-housing part 11 and the motor-housing part 12) is described.

As shown in FIG. 2, the driving-mechanism-housing part 11 is a portion of the body housing 10 which extends along the driving axis A1 in the front-rear direction, as described above. The driving mechanism 3 is housed in the driving-mechanism-housing part 11. The driving mechanism 3 is configured to drive the tool accessory 91 by power of the motor 2. In the present embodiment, the driving mechanism 3 includes a motion-converting mechanism 30, a striking mechanism 36 and a rotation-transmitting mechanism 37. The motion-converting mechanism 30 and the striking mechanism 36 are configured to perform the hammering operation of linearly driving the tool accessory 91 along the driving axis A1. The rotation-transmitting mechanism 37 is configured to perform the drilling operation of rotationally driving the tool accessory 91 around the driving axis A1. The structures of the motion-converting mechanism 30, the striking mechanism 36 and the rotation-transmitting mechanism 37 are well known and therefore briefly described below.

The motion-converting mechanism 30 is configured to convert rotation of the motor 2 into linear motion and to transmit it to the striking mechanism 36. In the present embodiment, the motion-converting mechanism 30 with a swinging member 33 is adopted. The motion-converting mechanism 30 includes an intermediate shaft 31, a rotary body 32, the swinging member 33 and a piston cylinder 35. The intermediate shaft 31 is disposed below the driving axis A1 to extend in parallel to the driving axis A1 (in the front-rear direction). The rotary body 32 is disposed onto an outer periphery of the intermediate shaft 31. The swinging member 33 is mounted on an outer periphery of the rotary body 32 and caused to swing in the front-rear direction by rotation of the rotary body 32. The piston cylinder 35 has a bottomed circular cylindrical shape. The piston cylinder 35 is supported within a circular cylindrical sleeve 34 so as to be movable in the front-rear direction. The piston cylinder 35 is caused to reciprocate in the front-rear direction by the swinging movement of the swinging member 33. The sleeve 34 is coaxially and integrally connected to a rear portion of the tool holder 39. The tool holder 39 and the sleeve 34 which are integrally connected together are supported to be rotatable around the driving axis A1.

The striking mechanism 36 is configured to linearly move and strike the tool accessory 91 so as to linearly drive the tool accessory 91 along the driving axis A1. In the present embodiment, the striking mechanism 36 includes a striking element in the form of a striker 361 and an intermediate element in the form of an impact bolt 363. The striker 361 is disposed within the piston cylinder 35 so as to be slidable in the driving-axis-A1 direction. An internal space of the piston cylinder 35 behind the striker 361 is defined as an air chamber which functions as an air spring. The impact bolt 363 is disposed within the tool holder 39 so as to be slidable in the driving-axis-A1 direction.

When the motor 2 is driven and the piston cylinder 35 is moved forward, air in the air chamber is compressed and the internal pressure increases. Therefore, the striker 361 is pushed forward at high speed and collides with the impact bolt 363, so that the kinetic energy is transmitted to the tool accessory 91. As a result, the tool accessory 91 is linearly driven along the driving axis A1 and strikes a workpiece. On the other hand, when the piston cylinder 35 is moved rearward, the air in the air chamber expands and the internal pressure decreases, so that the striker 361 is retracted rearward. The tool accessory 91 is moved rearward when pressed against the workpiece. By repeating such operation, the motion-converting mechanism 30 and the striking mechanism 36 perform a hammering operation.

In the present embodiment, an idle-driving-prevention mechanism 38 is disposed within the tool holder 39. The idle-driving-prevention mechanism 38 is configured to prevent an idle driving operation. Prevention of the idle driving operation used herein means preventing the striker 361 from reciprocating when the tool accessory 91 is not coupled to the tool holder 39 or when the tool accessory 91 is not pressed against the workpiece, that is, when no load is applied. Such a state is hereinafter referred to as an unloaded state.

The idle-driving-prevention mechanism 38 of the present embodiment includes a holding member 381 and an O-ring 383. The holding member 381 is an elastic member which may be disposed around the striker 361. The O-ring 383 is disposed inside a rear end portion of the holding member 381. Although not shown in detail, when a load is applied by the tool accessory 91 being pressed against the workpiece (such a state is hereinafter referred to as a loaded state), a rear end portion of the impact bolt 363 is pushed into a rearmost position and placed within the O-ring 383. If the motor 2 continues to be driven even in the unloaded state, as shown in FIG. 2, a front end portion of the striker 361 is pushed forward and fitted into the O-ring 383. The striker 361 is gripped by the O-ring 383 and held in its foremost position. In this manner, the idle driving operation can be prevented. Gripping of the striker 361 by the O-ring 383 (in other words, the function of preventing the idle driving operation) is released when the impact bolt 363 is pushed to the rearmost position by the tool accessory 91 being pushed into the body housing 10.

The rotation-transmitting mechanism 37 is configured to transmit rotation of the motor shaft 25 to the tool holder 39. In the present embodiment, the rotation-transmitting mechanism 37 is configured as a gear speed reducing mechanism including a plurality of gears. Rotation speed of the motor 2 is appropriately reduced by the rotation-transmitting mechanism 37 and then transmitted to the tool holder 39.

The hammer drill 1 of the present embodiment is configured such that any one of three operation modes of a hammer drill mode, a hammer mode and a drill mode is selectable, by operating a mode-switching dial (not shown) The mode-switching dial is provided on a left-side portion of the driving-mechanism-housing part 11. In the hammer drill mode, the motion-converting mechanism 30 and the rotation-transmitting mechanism 37 are driven so that the hammering operation and the drilling operation are performed. In the hammer mode, power transmission in the rotation-transmitting mechanism 37 is interrupted and only the motion-converting mechanism 30 is driven, so that only the hammering operation is performed. In the drill mode, power transmission in the motion-converting mechanism 30 is interrupted and only the rotation-transmitting mechanism 37 is driven, so that only the drilling operation is performed. A mode-switching mechanism is provided within the body housing 10 (specifically, the driving-mechanism-housing part 11) and connected to the mode-switching dial. The mode-switching mechanism is configured to switch the motion-converting mechanism 30 and the rotation-transmitting mechanism 37 between a transmission state and an interruption state according to the operation mode selected with the mode-switching dial. The structure of such a mode-switching mechanism is well known and therefore not described in detail here and not shown.

As shown in FIG. 2, the motor-housing part 12 is a portion of the body housing 10 which is connected to a rear end portion of the driving-mechanism-housing part 11 and extends downward. The motor 2 is housed within an upper portion of the motor-housing part 12. In the present embodiment, a direct current (DC) brushless motor is employed as the motor 2, since it is compact and has high output.

The motor 2 includes a motor body 20 and the motor shaft 25. The motor body 20 includes a stator 21 and a rotor 23. The motor shaft 25 extends from the rotor 23 and rotates together with the rotor 23. The rotation axis of the motor shaft 25 extends obliquely downward and forward relative to the driving axis A1. An upper end portion of the motor shaft 25 protrudes into the driving-mechanism-housing part 11. A small bevel gear 26 is formed on the upper end portion of the motor shaft 25. The small bevel gear 26 is engaged with a large bevel gear 311 fixed to a rear end portion of the intermediate shaft 31.

A portion (specifically, a lower connection part 18) of the handle 15 is disposed within a rear portion of a lower portion (specifically, a region on the lower side of the motor 2) of the motor-housing part 12.

The detailed structure of the handle 15 and its internal structure are now described.

Figure 3:
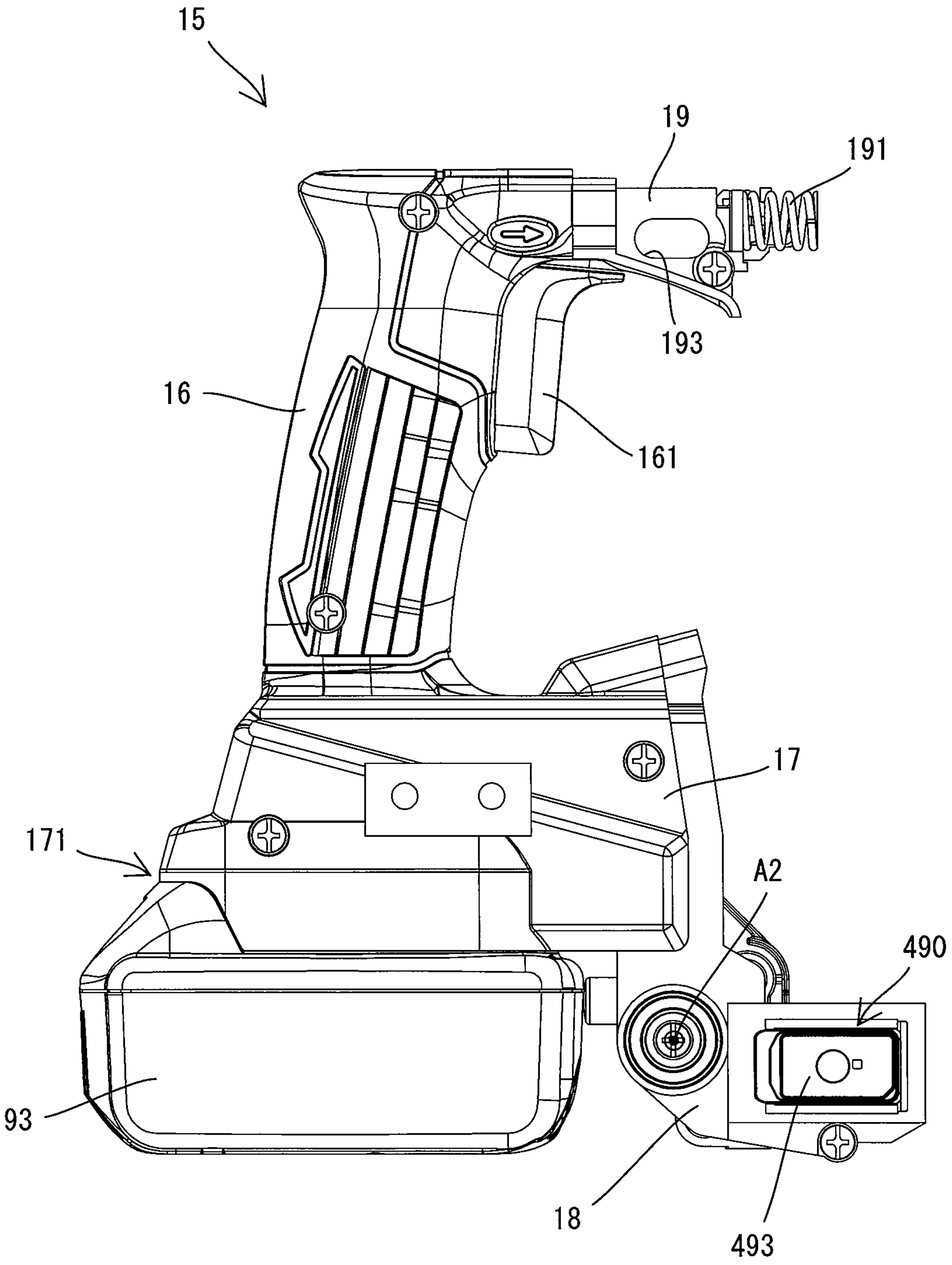
FIG. 3 is a right side view of a handle with a battery mounted thereto.
Figure 4:
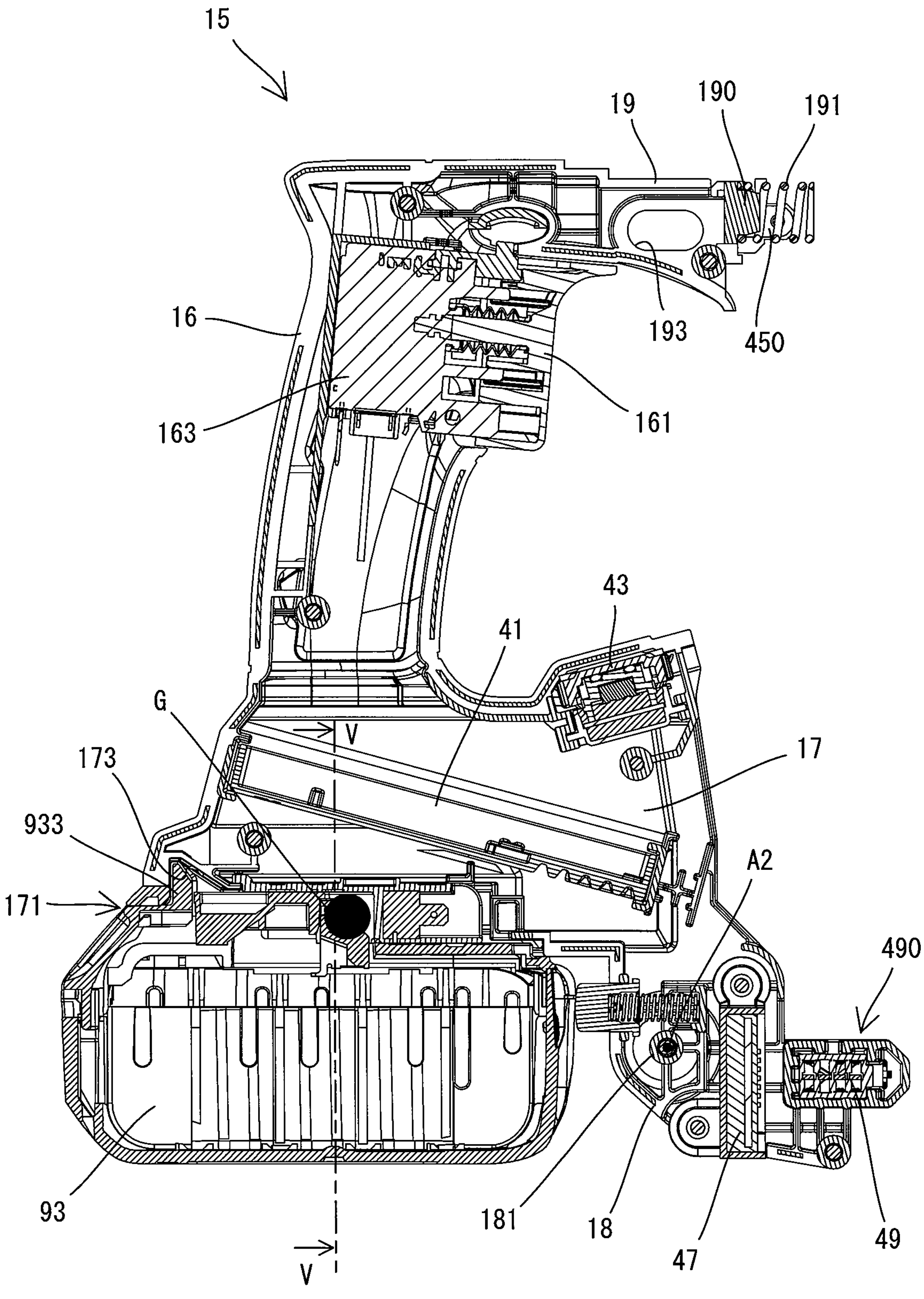
FIG. 4 is a sectional view of the handle with the battery mounted thereto.

As shown in FIGS. 3 and 4, the handle 15 includes the grip part 16, a controller-housing part 17, the lower connection part 18 and an upper connection part 19. In the present embodiment, the handle 15 is formed by right and left halves connected together. The halves are connected at a plurality of positions by screws with internal components described below being assembled thereto.

The grip part 16 is arranged to extend in the up-down direction as described above. The trigger 161 is provided in an upper front end portion of the grip part 16. It is noted that the trigger 161 is located on the driving axis A1 (see FIG. 2). The grip part 16 has an elongate cylindrical shape. A switch 163 is housed in the inside of the grip part 16. The switch 163 is normally kept in an OFF state and turned on in response to a depressing operation of the trigger 161. The switch 163 is connected to the controller 41 via a wiring (not shown) and outputs a signal indicating an ON or OFF state to the controller 41.

The controller-housing part 17 is connected to the lower end portion of the grip part 16 and disposed on the lower side of the grip part 16. The controller-housing part 17 has a rectangular box-like shape and extends forward of the grip part 16. The controller 41 and a speed-change dial unit 43 are housed in the controller-housing part 17.

Although not shown in detail, the controller 41 includes a control circuit, a three-phase inverter and a board on which these parts are mounted. The control circuit comprises a microcomputer including a CPU, a ROM, a RAM and a timer. The three-phase inverter includes a three-phase bridge circuit using six semiconductor switching elements. The three-phase inverter is configured to drive the motor 2 by switching each of the switching elements of the three-phase bridge circuit according to the duty ratio which is indicated by a control signal outputted from the control circuit. In the present embodiment, the controller 41 is configured to control driving of the motor 2 based on the ON/OFF state of the switch 163 and detection results of various sensors, which will be described in detail later.

The speed-change dial unit 43 is provided to receive setting of the rotation speed of the motor 2 according to a user's external operation. Although not shown in detail, the speed-change dial unit 43 includes a dial, a variable resistor and a circuit board. The dial is configured to be turned from the outside of the controller-housing part 17 by a user. The variable resistor outputs a resistance value corresponding to the turning position of the dial. The variable resistor is mounted on the circuit board. The speed-change dial unit 43 is connected to the controller 41 via a wiring (not shown) and outputs to the controller 41 a signal indicating a resistance value (that is, set rotation speed) corresponding to a dial turning operation. In the present embodiment, the rotation speed set with the speed-change dial unit 43 is used as the rotation speed of the motor 2 in the loaded state, which will be described in detail later.

Figure 5:
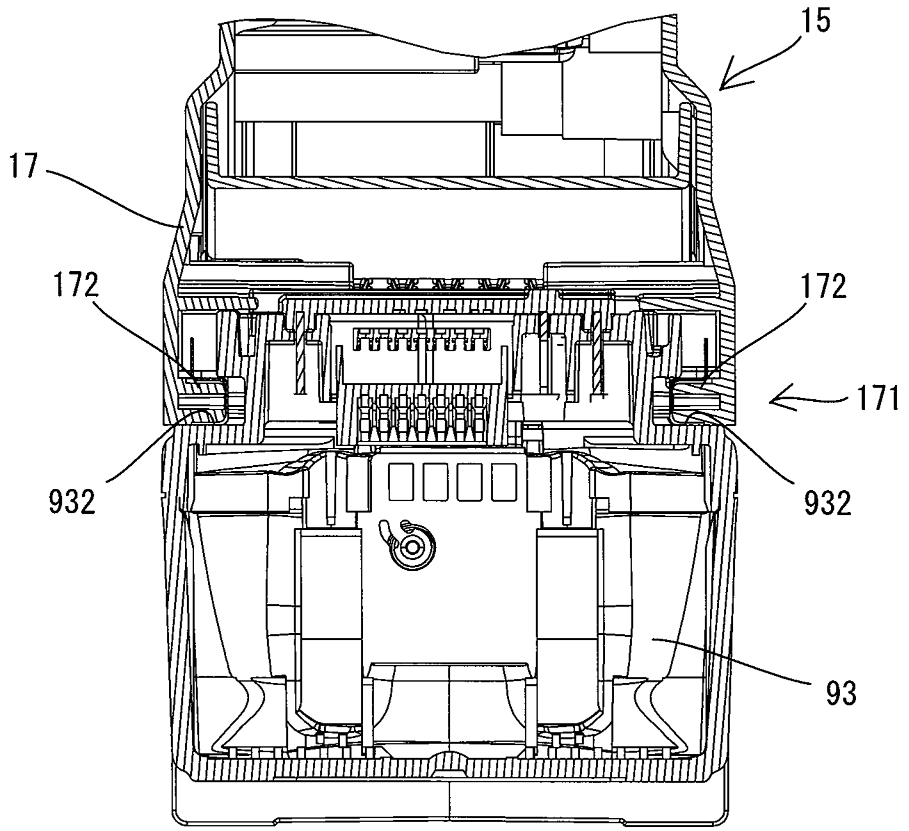
FIG. 5 is a sectional view taken along line V-V in FIG. 4.

A lower end portion (a portion below the controller 41) of the controller-housing part 17 is configured as the battery-mounting part 171, to which the battery 93 can be removably mounted. In the present embodiment, the battery-mounting part 171 is configured such that the battery 93 can be mounted thereto from the rear. Specifically, as shown in FIG. 5, the battery-mounting part 171 includes a pair of guide rails 172 which can be slidingly engaged with the battery 93. The guide rails 172 protrude inward from lower ends of right and left walls of the controller-housing part 17 and extend in the front-rear direction. Correspondingly, a guide groove 932 is provided in each of a pair of side surfaces of the battery 93, which has a generally rectangular parallelepiped shape. The guide grooves 932 extend in a longitudinal direction of the battery 93. The battery 93 may be mounted to the battery-mounting part 171 by sliding forward from the rear with the guide rails 172 engaged with the guide grooves 932.

Further, as shown in FIG. 4, a hook 933 is provided in an upper portion of the battery 93. The hook 933 is configured to be normally biased upward to protrude from an upper surface of the battery 93 and to be retracted downward from the upper surface by pressing. A recess 173 recessed upward is provided in a lower surface of the battery-mounting part 171. The hook 933 is retracted downward while the battery 93 is slid, and when the hook 933 reaches a position facing the recess 173, the hook 933 is biased upward and engaged with the recess 173. In this manner, the battery 93 is held by the guide rails 172 in the up-down direction while being positioned in the front-rear direction by engagement between the hook 933 and the recess 173. Further, although not shown in detail, terminals of the battery 93 and the battery-mounting part 171 are electrically connected to each other when the battery 93 is mounted to the battery-mounting part 171.

A battery which can be removably mounted to the battery-mounting part 171 is not limited to the battery 93. Specifically, plural kinds of batteries of different capacity and size are also available. In FIG. 1, a largest battery 930 of the batteries which can be removably mounted to the battery-mounting part 171 is shown by one-dot chain line. The body housing 10 is configured such that a lower surface of the battery 930 and a lower surface of the body housing 10 (the motor-housing part 12) are flush with each other when the battery 930 is mounted to the battery-mounting part 171.

As shown in FIGS. 3 and 4, the lower connection part 18 is a portion of the handle 15 which is connected to a front end portion of the controller-housing part 17 and extends generally downward. The upper connection part 19 is a portion of the handle 15 which is connected to an upper end portion of the grip part 16 and extends forward. In the present embodiment, the handle 15 is connected to the body housing 10 via the lower connection part 18 and the upper connection part 19 such that the handle 15 is movable relative to the body housing 10. Connecting structures between the body housing 10 and the lower and upper connection parts 18 and 19 are now described in detail.

Figure 6:
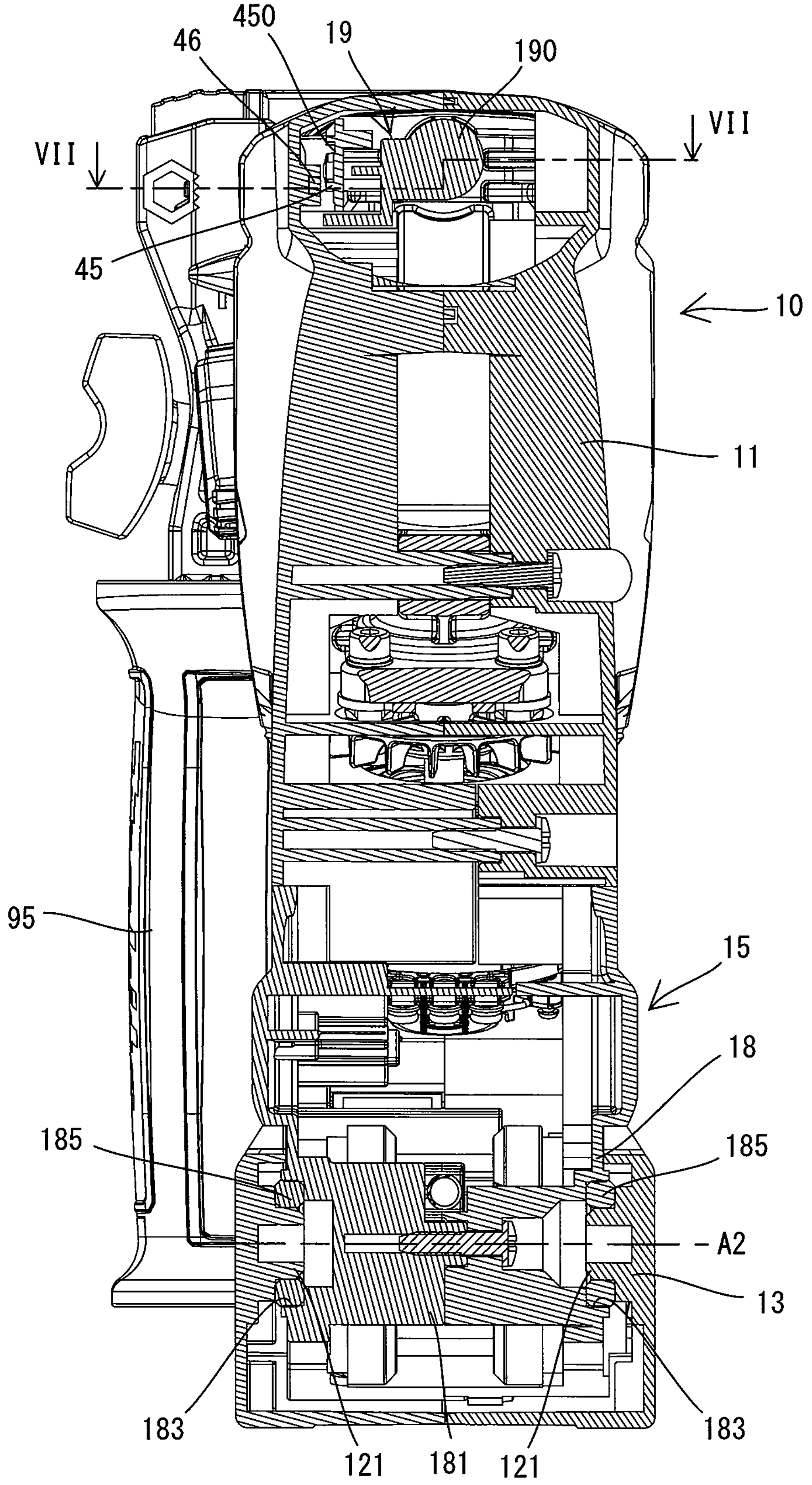
FIG. 6 is a sectional view taken along line VI-VI in FIG. 2.

As shown in FIGS. 2 and 6, the lower connection part 18 is arranged to protrude into a lower rear end portion of the motor-housing part 12 and connected to a lower rear end portion (specifically, the motor-housing part 12) of the body housing 10 so as to be rotatable relative to the body housing 10 around a rotation axis A2, which extends in the left-right direction. As described above, the motor 2 is disposed in the upper portion of the motor-housing part 12, but a free space exists below the motor 2. Therefore, in the present embodiment, the lower connection part 18 is arranged by utilizing this free space to connect the handle 15 and the motor-housing part 12.

In the present embodiment, the rotation axis A2 is set on a lower side of the battery-mounting part 171 (more specifically, on a lower side of the guide rails 172 (see FIG. 5)) in the lower connection part 18. Further, as shown in FIG. 4, the rotation axis A2 is also set on a lower side of a center of gravity G of the handle 15 with the battery 93 mounted to the battery-mounting part 171. The center of gravity G of the handle 15 with the battery 93 mounted to the battery-mounting part 171 is located generally in the same position as the guide rails 172 in the up-down direction. As described above, a battery larger than the battery 93 can be mounted to the hammer drill 1. A center of gravity of the handle 15 with a larger battery is slightly below the center of gravity G. The rotation axis A2 is set on the lower side of a center of gravity (not shown) of the handle 15 with the battery 930 of the maximum size shown in FIG. 1. When the battery 93 or a battery of different size is mounted to the battery-mounting part 171, the rotation axis A2 is located on a front side of the battery 93. Further, the rotation axis A2 is set on the lower side of and on the rear side of the motor body 20. Furthermore, the rotation axis A2 is set right below the upper connection part 19 (specifically, a center of a elongate hole 193 described below).

As shown in FIG. 6, the lower connection part 18 has a shaft part 181. The shaft part 181 extends in the left-right direction between right and left walls of the lower connection part 18 such that a center axis of the shaft part 181 coincides with the rotation axis A2. More specifically, the right and left halves forming the handle 15 have protruding parts which extend to the left and right along the rotation axis A2, respectively. The shaft part 181 is formed by connecting these protruding parts with a screw. Recesses 183 are respectively provided in positions corresponding to both end portions of the shaft part 181 in outer surfaces of the right and left walls of the lower connection part 18. Each of the recesses 183 is configured to have a circular section centering the rotation axis A2. An annular elastic member 185 is fitted in each of the recesses 183.

Protruding parts 121 are respectively provided to protrude to the left and right from inner surfaces of right and left walls of the motor-housing part 12. Each of the protruding parts 121 has a generally cylindrical shape and arranged such that its axis coincides with a straight line extending in the left-right direction. Each of protruding end parts of the protruding parts 121 is fitted in the elastic member 185 within the recess 183, so that the lower rear end portion of the motor-housing part 12 is connected to the lower connection part 18 via the elastic member 185. By such concavo-convex engagement via the elastic member 185, the lower connection part 18 is connected to the motor-housing part 12 so as to be rotatable around the rotation axis A2 relative to the motor-housing part 12. Further, the lower connection part 18 is held to be movable in all of the front-rear, left-right and up-down directions relative to the motor-housing part 12 by the elastic member 185.

As shown in FIG. 2, the upper connection part 19 is arranged to protrude into a rear end portion of the driving-mechanism-housing part 11 and movably connected to an upper rear end portion (specifically, the driving-mechanism-housing part 11) of the body housing 10 via an elastic member 191. In the present embodiment, a compression coil spring is employed as the elastic member 191. A rear end portion of the elastic member 191 is fitted onto a spring-receiving part 190 (see FIG. 4) provided in a front end portion of the upper connection part 19. A front end of the elastic member 191 is held in abutment with a rear surface of a support wall 111 disposed within a rear end portion of the driving-mechanism-housing part 11. Specifically, the elastic member 191 is arranged such that its spring force acts in a direction which substantially coincides with the front-rear direction, which is a direction of dominant vibration caused during the hammering operation.

Figure 7:
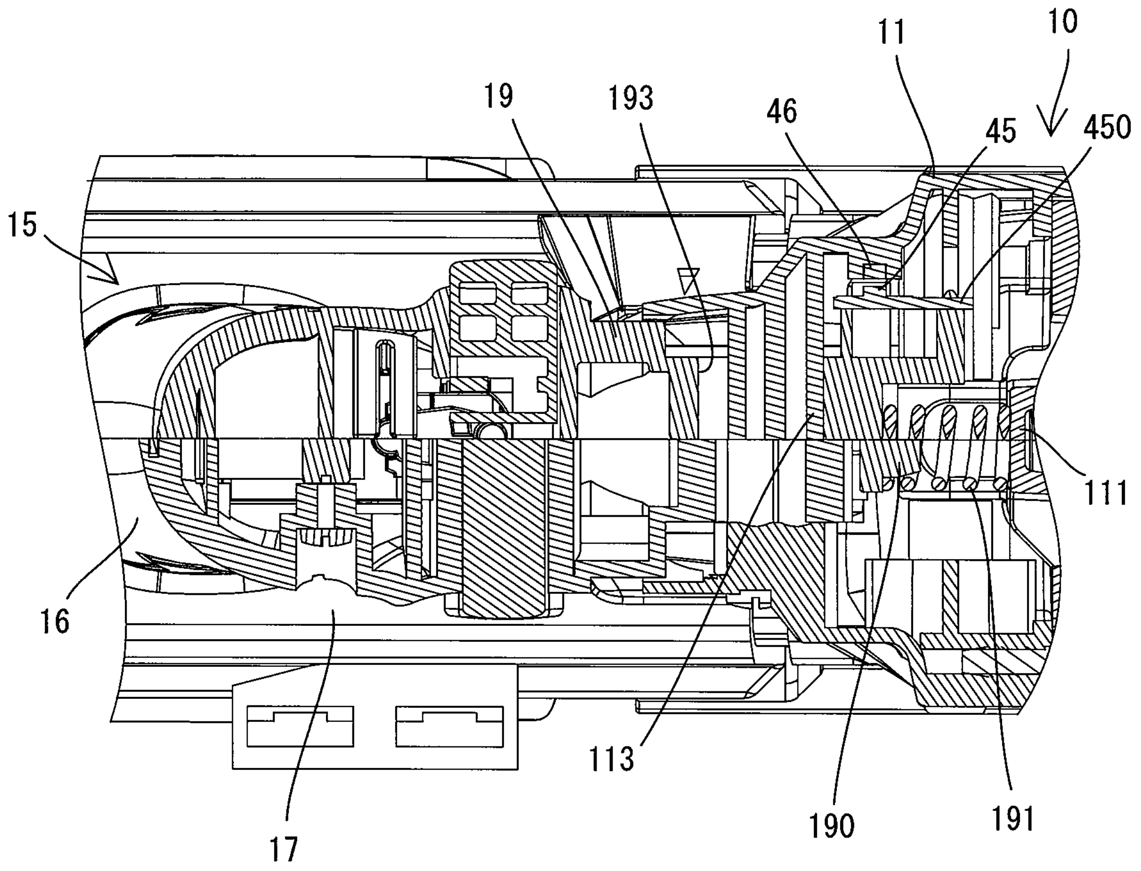
FIG. 7 is a sectional view taken along line VII-VII in FIG. 6 and showing the hammer drill when the handle is located in a rearmost position.

Further, as shown in FIG. 4, the upper connection part 19 has a elongate hole 193 formed on the rear side of the spring-receiving part 190. The elongate hole 193 is a through hole extending through the upper connection part 19 in the left-right direction and formed longer in the front-rear direction than in the up-down direction. As shown in FIGS. 2 and 7, a stopper part 113 is provided inside the driving-mechanism-housing part 11. The stopper part 113 is a columnar portion extending in the left-right direction between right and left walls of the driving-mechanism-housing part 11 and inserted through the elongate hole 193.

Figure 8:
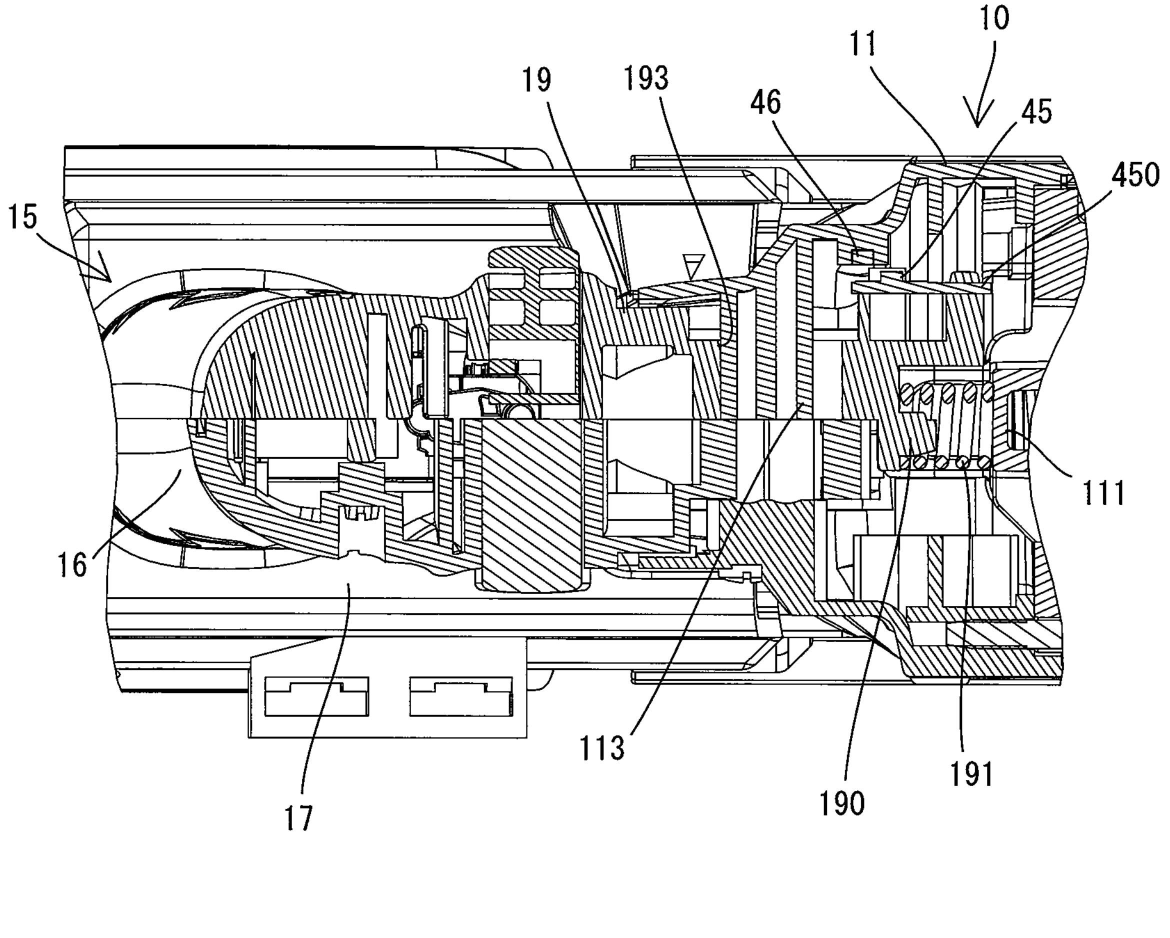
FIG. 8 is a sectional view corresponding to FIG. 7 and showing the hammer drill when the handle is located in a foremost position.

In the unloaded state, the upper connection part 19 is biased in a direction (rearward) away from the body housing 10 in the front-rear direction by the elastic member 191, and held in a position where the stopper part 113 abuts on a front end of the elongate hole 193 and thereby prevents a further rearward movement of the upper connection part 19. This position of the upper connection part 19 (the handle 15) relative to the body housing 10 is referred to as a rearmost position. When the handle 15 is relatively turned forward around the rotation axis A2, the stopper part 113 of the body housing 10 relatively moves rearward apart from the front end of the elongate hole 193 within the elongate hole 193 of the upper connection part 19. Therefore, the elongate hole 193 is allowed to move in the front-rear direction relative to the stopper part 113. As shown in FIG. 8, the upper connection part 19 is allowed to relatively move forward against biasing force of the elastic member 191, up to a position where the stopper part 113 abuts on a rear end of the elongate hole 193 and thereby prevents a further forward movement of the upper connection part 19. This position of the upper connection part 19 (the handle 15) relative to the body housing 10 is referred to as a foremost position.

The internal structures of the lower connection part 18 and the upper connection part 19 are now described in detail.

As shown in FIG. 4, an acceleration sensor unit 47 is housed in the lower connection part 18. The acceleration sensor unit 47 is disposed in front of the shaft part 181 in a lower end portion of the lower connection part 18. Further, the lower connection part 18 has an adapter-mounting part 490 to which a wireless adapter 49 can be removably mounted. The adapter-mounting part 490 is disposed in front of the acceleration sensor unit 47 in a front end portion of the lower connection part 18.

In the present embodiment, the acceleration sensor unit 47 includes an acceleration sensor having a well known structure, a microcomputer including a CPU, a ROM and a RAM and a board on which these components are mounted. In the present embodiment, driving of the motor 2 is stopped in a case where the body housing 10 is excessively rotated around the driving axis A1, which will be described in detail later. For this purpose, the acceleration sensor detects acceleration as information (a physical quantity or an index) which corresponds to rotation of the body housing 10 around the driving axis A1. The microcomputer is configured to appropriately perform arithmetic processing on the acceleration detected by the acceleration sensor, and to determine whether rotation of the body housing 10 around the driving axis A1 exceeds a specified limit. In a case where the rotation of the body housing 10 around the driving axis A1 exceeds the specified limit, the microcomputer outputs a specific signal (hereinafter referred to as an error signal) to the controller 41.

The state in which the rotation of the body housing 10 around the driving axis A1 exceeds the specified limit corresponds to a state in which the body housing 10 is excessively rotated around the driving axis A1. Such a state may typically occur when the tool holder 39 becomes unable to rotate (also referred to as being locked or blocked), for example, due to the tool accessory 91 being locked into the workpiece, for example, so that excessive reaction torque acts on the body housing 10.

The acceleration sensor unit 47 need not include the microcomputer. Instead, the acceleration sensor unit 47 may directly output a signal indicating a detection result of the acceleration sensor to the controller 41, and the controller 41 may make the above-described determination. Drive control of the motor 2 based on the signals outputted from the acceleration sensor unit 47 will be described in detail later.

Figure 9:
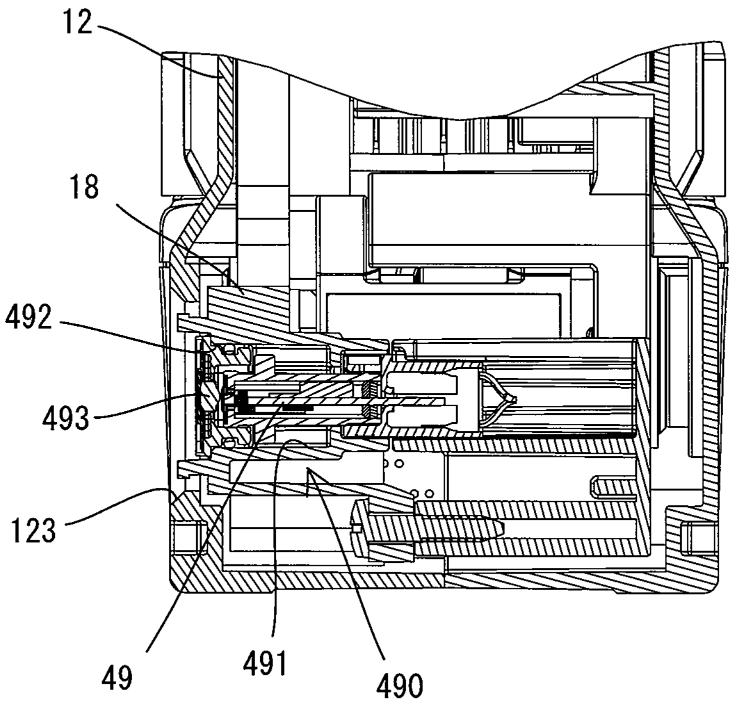
FIG. 9 is a sectional view taken along line IX-IX in FIG. 2.

As shown in FIG. 9, the adapter-mounting part 490 includes a housing part 491 in which the wireless adapter 49 can be housed, an insertion port 492 through which the wireless adapter 49 can be inserted into and removed from the housing part 491, and a connector (not shown). The insertion port 492 is an opening formed in a right wall of the lower connection part 18. The insertion port 492 is normally closed by a removable dustproof cap 493. The wireless adapter 49 can be slid to the left to be inserted into the housing part 491 through the insertion port 492. When the wireless adapter 49 is inserted to a specified position in the housing part 491, a connector of the wireless adapter 49 is electrically connected to the connector of the adapter-mounting part 490. As described above, the lower connection part 18 is disposed within the lower rear end portion of the motor-housing part 12. Therefore, as shown in FIGS. 1 and 9, an opening 123 slightly larger than the insertion port 492 is formed in the right wall of the motor-housing part 12. More specifically, the opening 123 is disposed in a position so as to face the housing part 491 (the insertion port 492). A user can easily insert the wireless adapter 49 into the housing part 491 of the lower connection part 18 from the outside of the motor-housing part 12 through the opening 123 as needed.

The wireless adapter 49 which is removable from the adapter-mounting part 490 is configured to perform wireless communication with an external device. Although not shown in detail, in the present embodiment, the wireless adapter 49 has a known structure having a microcomputer including a CPU, a ROM and a RAM, an antenna and the connector. When mounted to the adapter-mounting part 490, the wireless adapter 49 is electrically connected to the controller 41 via the connector. The wireless adapter 49 is configured to wirelessly send a specified interlock signal to a stationary dust collector which is separately provided from the hammer drill 1, by using radio waves in a specified frequency band, according to a control signal from the controller 41.

Such a system itself is well known and therefore briefly described. The controller 41 causes the wireless adapter 49 to send the interlock signals while the trigger 161 is depressed and the switch 163 is in the ON state. A controller of the dust collector is configured to drive a motor of the dust collector while receiving the interlock signals from the wireless adapter 49. Therefore, a user of the hammer drill 1 can operate the dust collector interlocking with the hammer drill 1 simply by depressing the trigger 161. The wireless adapter 49 is not limited to those configured to send the interlock signal to the dust collector, but may be configured to perform wireless communication with other external devices (such as a portable terminal).

As shown in FIGS. 6 and 7, a position sensor 45 for detecting the position of the handle 15 relative to the body housing 10 is provided in the upper connection part 19. In the present embodiment, a Hall sensor having a Hall element is employed as the position sensor 45. The position sensor 45 is mounted on a board 450 and fixed to a left front end portion of the upper connection part 19 so as to face a left wall of the body housing 10 (the driving-mechanism-housing part 11). More specifically, the position sensor 45 is disposed generally in the same position as a rear end portion of the elastic member 191 in the front-rear direction. A magnet 46 is fixed to an inner surface of the left wall of the body housing 10. The position sensor 45 is electrically connected to the controller 41 via a wiring (not shown) and is configured to output a specific signal (hereinafter referred to as an ON signal) to the controller 41 when the magnet 46 is located within a specified detection range.

In the present embodiment, as shown in FIG. 7, when the handle 15 is located in the rearmost position (initial position) relative to the body housing 10, the magnet 46 is located within the detection range of the position sensor 45, so that the position sensor 45 outputs an ON signal. When the handle 15 moves forward from the rearmost position relative to the body housing 10 and reaches a specified position, the magnet 46 moves out of the detection range of the position sensor 45, so that the position sensor 45 stops outputting the ON signal. This specified position (hereinafter referred to as an OFF position) is set slightly rearward of the foremost position shown in FIG. 8. The position sensor 45 does not output an ON signal when the handle 15 is located between the OFF position and the foremost position. Detection results of the position sensor 45 are used for control of the rotation speed of the motor 2 by the controller 41, which will be described in detail later.

As described above, the handle 15 is configured such that its lower end portion is connected to the lower rear end portion of the body housing 10 so as to be rotatable around the rotation axis A2, while its upper end portion is elastically connected to the upper rear end portion of the body housing 10 via the elastic member 191. Further, the rotation axis A2 is set on the lower side of the battery-mounting part 171 (specifically, on the lower side of the guide rails 172). With such a structure, vibration which is caused in the body housing 10 when the motor 2 and the driving mechanism 3 are driven can be effectively suppressed from being transmitted to the handle 15 (particularly the grip part 16).

Specifically, when the driving mechanism 3 is driven, vibrations in the front-rear direction and the up-down direction are caused in the body housing 10. At this time, relative rotation of the handle 15 around the rotation axis A2 can cope with the vibration in the front-rear direction, and particularly, the elastic member 191 can absorb the dominant vibration in the driving-axis-A1 direction (the front-rear direction) which is caused by the tool accessory 91 being reciprocally driven. Further, in the present embodiment, by arranging the rotation axis A2 on the lower side of the battery-mounting part 171, the distance between the elastic member 191 and the rotation axis A2 can be secured as large as possible. As a result, the elastic member 191 can efficiently absorb vibration in a position where the swing width (the amount of movement) of the handle 15 relative to the body housing 10 is large, so that transmission of vibration to the grip part 16 can be effectively suppressed.

Particularly, in the present embodiment, the rotation axis A2 is set right below the upper connection part 19 (specifically, generally right below the rear end portion of the elastic member 191). In other words, in the driving-axis-A1 direction (front-rear direction), a pivot point of the handle 15 is set generally at the same position as the elastically connecting portion. Further, the elastic member 191 is arranged to be expandable and contractible in parallel to the driving axis A1. Therefore, vibration in the front-rear direction can be efficiently reduced.

Further, the rotation axis A2 is set on the lower side of the center of gravity G of the handle with the battery 93 mounted to the battery-mounting part 171. In a structure in which the upper end portion of the handle 15 is elastically connected to the body housing 10 and the lower end portion is rotatably connected to the body housing 10, the handle 15 may not always easily turn around the rotation axis A2 if the rotation axis A2 is located on the upper side of the center of gravity G. In the present embodiment, however, the rotation axis A2 arranged on the lower side of the center of gravity G can make it easier for the handle 15 to turn around the rotation axis A2 relative to the body housing 10 when vibration is caused in the body housing 10, thereby enhancing the effect of suppressing transmission of vibration to the grip part.

Further, in the present embodiment, the protruding parts 121 of the motor-housing part 12 is fitted in the recesses 183 of the lower connection part 18 via the annular elastic members 185. Therefore, the annular elastic members 185 can also suppress vibrations in the front-rear direction and the up-down direction which are caused in the body housing 10 from being transmitted to the handle 15.

The hammer drill 1 includes the controller 41, the speed-change dial unit 43, the position sensor 45, the acceleration sensor unit 47, the wireless adapter 49 and the adapter-mounting part 490. All of these parts have electronic components and are preferred to be protected from vibration. Therefore, these parts are disposed in the handle 15 to be properly protected from vibration. Further, in the present embodiment, the lower connection part 18 performs not only a function of connecting to the motor-housing part 12, but also a function of housing the acceleration sensor unit 47 and the wireless adapter 49 while protecting them from vibration, by utilizing a free space existing on the lower side of the motor 2 in the motor-housing part 12. Further, the position sensor 45 is disposed adjacent to the elastic member 191 in the upper connection part 19, so that an optimal arrangement for detecting the movement of the handle 15 relative to the body housing 10 in the front-rear direction can be realized.

The drive control of the motor 2 by the controller 41 is now described.

In the present embodiment, the controller 41 (more specifically, the CPU of the controller 41) performs a so-called soft-no-load control. The soft-no-load control refers to a drive control method for the motor 2 in which, while the switch 163 is in the ON state, the motor 2 is driven at low speed in an unloaded state, and the motor 2 is driven at higher speed in a loaded state. The soft-no-load control is also referred to as a low-speed rotation control in the unloaded state. In the following description, the rotation speed of the motor 2 in the unloaded state is referred to as a first rotation speed, and the rotation speed of the motor 2 in the loaded state is referred to as a second rotation speed. In the present embodiment, the controller 41 sets the rotation speed which is set with the speed-change dial unit 43 as the second rotation speed. Further, the controller 41 sets half the second rotation speed as the first rotation speed. The controller 41 sets a duty ratio corresponding to the first rotation speed or the second rotation speed and outputs a control signal to the three-phase inverter to thereby drive the motor 2.

In the present embodiment, detection results of the position sensor 45 are used in the soft-no-load control to determine whether the current state is the unloaded state or the loaded state. As described above, the position sensor 45 is configured to detect the position of the handle 15 relative to the body housing 10. In the unloaded state, the upper connection part 19 is placed in the rearmost position by the biasing force of the elastic member 191 (see FIGS. 2 and 7). At this time, the position sensor 45 detects the magnet 46 and outputs an ON signal. When the output from the position sensor 45 is ON, the controller 41 determines that the motor 2 is in the unloaded state, and when the switch 163 is turned from the OFF state to the ON state, the controller 41 starts driving of the motor 2 at the first rotation speed. When the motor 2 is driven, the driving mechanism 3 is driven according to the operation mode selected via the mode-switching dial (not shown) so that at least one of the hammering operation and the drilling operation is performed.

When a user presses the tool accessory 91 against the workpiece while holding the grip part 16, the handle 15 relatively turns forward around the rotation axis A2. The upper connection part 19 moves forward from the rearmost position while compressing the elastic member 191. When the upper connection part 19 reaches the OFF position, the position sensor 45 stops outputting the ON signal. The controller 41 recognizes a change from ON to OFF of the output from the position sensor 45 as a shift from the unloaded state to the loaded state. The controller 41 increases the rotation speed of the motor 2 to the second rotation speed when recognizing the shift to the loaded state during driving of the motor 2 at the first rotation speed. At this time, the controller 41 may immediately or gradually increase the rotation speed of the motor 2 to the second rotation speed. In a case where the controller 41 immediately increases the rotation speed, the speed of reciprocating movement or rotation of the tool accessory 91 immediately increases, so that working efficiency can be improved. On the other hand, in a case where the controller 41 gradually increases the rotation speed, the speed of reciprocating movement or rotation of the tool accessory 91 gradually increases, so that excellent operation feeling can be provided to a user. Further, when the switch 163 is turned on while the output from the position sensor 45 is OFF, the controller 41 starts driving of the motor 2 at the second rotation speed. In this case, the controller 41 may also immediately or gradually increase the rotation speed of the motor 2 to the second rotation speed.

In the present embodiment, the handle 15 is configured to be placed in the OFF position at the same time when or after the function of the idle-driving-prevention mechanism 38 for preventing the idle driving operation is released in response to the push of the tool accessory 91 into the body housing 10. Specifically, the handle 15 reaches the OFF position at the same time when or after the impact bolt 363 is pushed in to the rearmost position and the striker 361 is separated from the O-ring 383. For this purpose, the specifications (such as spring constant) of the elastic element 191 are appropriately set. By such control of timing, the reciprocating movement of the striker 361 can be immediately started when the rotation speed of the motor 2 is increased to the second rotation speed, so that excellent working efficiency can be secured.

Further, the controller 41 monitors the duration of the ON state using the timer when recognizing a change from OFF to ON of the output from the position sensor 45 (that is, a rearward movement of the upper connection part 19 from the OFF position toward the rearmost position) while the switch 163 is in the ON state. The controller 41 returns the rotation speed of the motor 2 back to the first rotation speed only when the ON state continues for a specified time (in the present embodiment, for a longer time than zero). This is to reliably distinguish between a temporary change to the ON state, which may be caused due to vibration of the body housing 10 during the operation on the workpiece, and a change from the loaded state to the unloaded state. Specifically, the upper connection part 19 may be caused to reciprocally move in the front-rear direction relative to the body housing 10 by vibration of the body housing 10 in the front-rear direction. In this case, the output from the position sensor 45 may be switched between ON and OFF at a short cycle. However, when the operation of pressing the tool accessory 91 is released and the loaded state is shifted to the unloaded state, the ON state continues for a specified time after the output from the position sensor 45 is switched from OFF to ON. Therefore, in the present embodiment, the above-described control is adopted.

When the depressing operation of the trigger 161 is stopped and the switch 163 is turned off, the controller 41 stops driving of the motor 2, regardless of whether the motor 2 is driven at the first rotation speed or the second rotation speed.

Further, in the present embodiment, in addition to the soft-no-load control, control based on detection results of the acceleration sensor unit 47 is also performed. More specifically, regardless of whether the motor 2 is driven at the first rotation speed or the second rotation speed, the controller 41 stops driving of the motor 2 in a case where the controller 41 recognizes an error signal outputted from the acceleration sensor unit 47. As described above, the error signal indicates an excessive rotation of the body housing 10 around the driving axis A1. Therefore, in case that this excessive rotation is caused by the locked state of the tool holder 39, the controller 41 stops driving of the motor 2 in order to prevent the body housing 10 from further rotating. The controller 41 may determine whether an excessive rotation is caused or not, based on other information (for example, a torque acting on the tool accessory 91, or a driving current of the motor 2) in addition to the error signal. Further, it may be preferred that the controller 41 not only stops energization to the motor 2 but also electrically brakes the motor 2 in order to prevent the motor shaft 25 from continuing to rotate by inertia of the rotor 23.

As described above, according to the drive control of the motor 2 of the present embodiment, the rotation speed of the motor 2 can be increased by properly detecting a shift from the unloaded state to the loaded state based on the relative position of the handle 15 which is detected by the position sensor 45. Thus, the motor 2 can be prevented from being unnecessarily driven at high speed when the tool accessory 91 is not striking the workpiece, so that vibration of the body housing 10 can be suppressed and consumption of the battery 93 can be suppressed. Particularly, in the present embodiment, the first rotation speed in the unloaded state is set to half the second rotation speed in the loaded state, so that consumption of the battery 93 in the unloaded state can be effectively suppressed.

As described above, the relative forward movement of the handle 15 corresponds to the shift from the unloaded state, in which the tool accessory 91 is not pressed against the workpiece, to the loaded state, in which the tool accessory 91 is pressed against the workpiece. However, the handle 15 may only slightly move forward upon a shift from the unloaded state to the loaded state in some types of operation. For example, in an operation such as peeling off a coating material (such as a tile), when an angle formed by the tool accessory 91 and the workpiece is small, the tool accessory 91 may not be strongly pressed rearward relative to the body housing 10. Therefore, an amount of a relative forward movement of the handle 15 may be very small. In such a case, the shift from the unloaded state to the loaded state may not be accurately determined only by the detection results of the position sensor 45. Therefore, the controller 41 may perform the rotation speed control of the motor 2 (the soft-no-load control) based on the position of the handle 15 relative to the body housing 10 and other information (a physical quantity or an index) corresponding to the load on the tool accessory 91. Examples of the information (a physical quantity or an index) corresponding to the load on the tool accessory 91 may include an electric current value of the motor 2, vibration (acceleration) of the body housing 10 and the temperature of the battery 93.

A modification in which the driving current of the motor 2 is adopted as the information is now specifically described.

Figure 10:
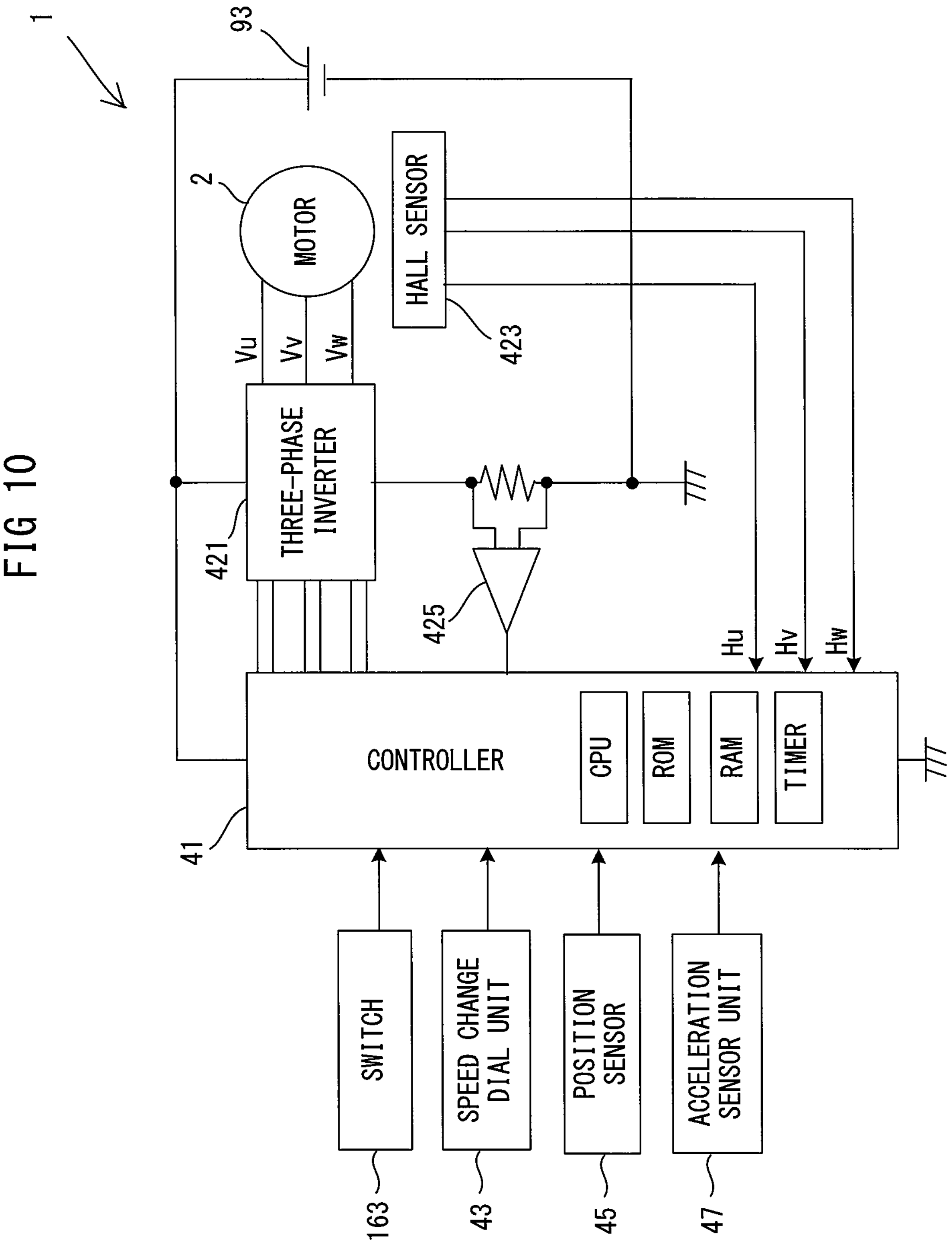
FIG. 10 is a block diagram showing an electrical configuration of the hammer drill.

FIG. 10 shows an electrical configuration of the hammer drill 1 when the driving current of the motor 2 is used. As shown in FIG. 10, a three-phase inverter 421, a Hall sensor 423 and a current detection amplifier 425 are electrically connected to the controller 41. The controller 41 controls the rotation speed of the motor 2 by controlling energization to the motor 2 via switching elements of the three-phase inverter 421 as described above, based on a signal indicating a rotor rotation angle which is inputted from the Hall sensor 423. The current detection amplifier 425 is configured to detect the driving current of the motor 2. More specifically, the current detection amplifier 425 is configured to convert the driving current of the motor 2 into voltage by shunt resistance and to output a signal amplified by the amplifier to the controller 41. Further, as described above, the switch 163, the speed-change dial unit 43, the position sensor 45 and the acceleration sensor unit 47 are electrically connected to the controller 41.

In this modification, the controller 41 is configured to drive the motor 2 at low speed when the detection results of the position sensor 45 and the detection results of the current detection amplifier 425 both indicate the unloaded state. Further, the controller 41 is configured to drive the motor 2 at higher speed when at least either the detection results of the position sensor 45 or the detection results of the current detection amplifier 425 indicate the loaded state.

More specifically, in a case where the output from the position sensor 45 is ON and the driving current value calculated based on the output signal of the current detection amplifier 425 does not exceed a specified threshold, the detection results of the position sensor 45 and the detection results of the current detection amplifier 425 both indicate the unloaded state. In this case, like in the above-described embodiment, the controller 41 drives the motor 2 at the first rotation speed. On the other hand, in a case where the output from the position sensor 45 is OFF or in a case where the calculated driving current value exceeds the threshold, either the detection results of the position sensor 45 or the detection results of the current detection amplifier 425 indicate the loaded state. In this case, like in the above-described embodiment, the controller 41 drives the motor 2 at the second rotation speed. Further, in this modification, the upper limit of the speed which can be set with the speed-change dial unit 43 is set lower than a maximum rotation speed of the motor 2. Therefore, the controller 41 drives the motor 2 at the maximum rotation speed (that is, at higher speed than the second rotation speed) in a case where the output from the position sensor 45 is OFF and the calculated driving current value exceeds the threshold (in other words, in a case where the detection results of the position sensor 45 and the detection results of the current detection amplifier 425 both indicate the loaded state).

In this manner, the hammer drill 1 of this modification can more reliably detect a shift from the unloaded state to the loaded state in various operation states, by using plural kinds of information which indicate a load on the tool accessory 91. Further, information of a different kind from the relative position of the handle 15 can be detected with a simple structure and used as the load on the tool accessory 91. Further, in a case where the loaded state is more reliably determined from the relative position of the handle 15 and the driving current value of the motor 2, the motor 2 is driven at the maximum rotation speed, so that working efficiency can be maximized.

As described above, in a case where vibration (acceleration) of the body housing 10 is adopted as other information (a physical quantity or an index) corresponding to the load on the tool accessory 91, the controller 41 may perform similar control based on the detection results of the position sensor 45 and the acceleration sensor unit 47. Further, in a case where the temperature of the battery 93 is adopted as other information (a physical quantity or an index) corresponding to the load on the tool accessory 91, for example, a temperature sensor may be disposed in the vicinity of the battery-mounting part 171 and the controller 41 may perform similar control based on the detection results of the position sensor 45 and the temperature sensor.

The above-described embodiment is a mere example and a work tool according to the present disclosure is not limited to the structure of the hammer drill 1 of the above-described embodiment. For example, the following modifications may be made. Further, one or more of these modifications may be employed in combination with any one of the hammer drill 1 of the above-described embodiment, its modification and the claimed inventions.

In the above-described embodiment, the hammer drill 1 is described as a work tool configured to linearly reciprocate the tool accessory 91, but the present disclosure can also be applied to, for example, an electric hammer and a reciprocating saw. The structures and arrangement relations of the motor 2, the driving mechanism 3, the body housing which houses the motor 2 and the driving mechanism 3, and the handle 15 including the grip part 16 may be appropriately modified or changed according to the work tool.

The connection manner between the body housing 10 and the handle 15 may be appropriately changed. For example, the elastic member 191 is not limited to the compression coil spring, but may be formed of, for example, a different type of spring, rubber or synthetic resin. Further, a plurality of elastic members may be adopted. The arrangement position of the elastic member 191 may be changed. The lower connection part 18 and the motor-housing part 12 may be connected to each other, for example, by a shaft extending in the left-right direction. The elastic member 185 may have a shape other than an annular shape. Further, in place of the single elastic member 185, a plurality of elastic members may be provided around the rotation axis A2 to be spaced apart from each other. Alternatively, the elastic member 185 may be omitted. The rotation axis A2 may be arranged in a different position from that in the above-described embodiment, as long as the rotation axis A2 is located on the lower side of the battery-mounting part 171 or on the lower side of the center of gravity of the handle 15 with the battery mounted thereto.

In the above-described embodiment, the devices having various electronic components are disposed in the handle 15, but these devices may be omitted or may be disposed in the body housing 10.

Correspondences between the features of the above-described embodiment and modification and the features of the invention are as follows. However, these correspondences given here are non-limiting examples. The hammer drill 1 is an example that corresponds to the "work tool". The tool accessory 91 is an example that corresponds to the "tool accessory". The motor 2 is an example that corresponds to the "motor". The driving mechanism 3 is an example that corresponds to the "driving mechanism". The driving axis A1 is an example that corresponds to the "driving axis". The body housing 10 is an example that corresponds to the "body housing". The handle 15, the grip part 16 and the battery-mounting part 171 are examples that correspond to the "handle", the "grip part" and the "battery-mounting part", respectively. The battery 93 is an example that corresponds to the "battery". The upper connection part 19 is an example that corresponds to the "upper end portion of the handle". The elastic member 191 is an example that corresponds to the "elastic member". The lower connection part 18 is an example that corresponds to the "lower end portion of the handle". The rotation axis A2 is an example that corresponds to the "rotation axis".

The motor body 20, the stator 21, the rotor 23 and the motor shaft 25 are examples that correspond to the "motor body", the "stator", the "rotor" and the "motor shaft", respectively. The speed-change dial unit 43 is an example that corresponds to the "speed-setting part". The wireless adapter 49 is an example that corresponds to the "wireless unit". The housing part 491 and the opening 123 are examples that correspond to the "housing part" and the "opening", respectively. The position sensor 45 is an example that corresponds to the "first detection part". The acceleration sensor unit 47 is an example that corresponds to the "second detection part".

In view of the nature of the present invention and the above-described embodiment, the following aspects are provided. Each of the following aspects may be used in combination with the hammer drill 1 of the above-described embodiment, the above-described modification and the claimed inventions.

Aspect 1

The rotation axis of the handle is located on the lower side of the battery-mounting part and on the lower side of a center of gravity of the handle with the battery mounted thereto.

Aspect 2

The rotation axis of the handle is located generally in the same position as the elastic member in the front-rear direction.

Aspect 3

The lower end portion of the handle is disposed within the body housing, and electronic components are disposed within the lower end portion of the handle.

Aspect 4

The lower end portion of the handle is disposed in a region of the body housing on a lower side of the motor.

Aspect 5

The upper end portion of the handle is connected to the rear end portion of the body housing on an upper side of the driving axis via the elastic member.

Aspect 6

The lower end portion of the handle is connected to the rear end portion of the body housing via an elastic member disposed around the rotation axis.

Further, the following aspects 7 to 22 are provided with an aim to provide an impact tool capable of controlling driving of a motor by properly detecting a loaded state. The following aspects 7 to 22 may be employed individually or in combination with each other. Alternatively, at least one of the following aspects 7 to 22 may be employed in combination with any one or more of the hammer drill 1, the above-described modifications and the claimed inventions.

Aspect 7

An impact tool, comprising:
- a motor;
- a driving mechanism configured to perform an operation of linearly driving a tool accessory along a driving axis by power of the motor, the driving axis extending in a front-rear direction of the impact tool;
- a body housing that houses the motor and the driving mechanism;
- a handle connected to the body housing via an elastic member so as to be movable relative to the body housing, the handle including a grip part to be held by a user;
- a battery-mounting part configured to removably receive a battery, the battery being a power source of the motor;
- a first detection part configured to detect a position of the handle relative to the body housing; and
- a control part configured to control rotation speed of the motor based on a detection result of the first detection part.

In the impact tool of the present aspect, the rotation speed of the motor can be controlled based on the detection result of the first detection part, that is, the position of the handle relative to the body housing. When the tool accessory is pressed against the workpiece, the handle which is elastically connected to the body housing moves forward relative to the body housing. Thus, a shift from an unloaded state to a loaded state corresponds to a relative forward movement of the handle. Therefore, according to the present aspect, the rotation speed of the motor can be controlled by properly detecting the shift from the unloaded state to the loaded state based on the relative position of the handle which is detected by the first detection part.

In the present aspect, the first detection part may be disposed in any position of the body housing or the handle, as long as it is capable of detecting the position of the handle relative to the body housing. The first detection part may be preferably disposed adjacent to the elastic member in order to accurately detect the position of the handle relative to the body housing. Further, any known detection method may be adopted as a detection method of the first detection part. For example, either one of non-contact type detection (such as a magnetic-field detection method and an optical detection method) and contact type detection may be adopted.

Aspect 8

The impact tool as defined in aspect 7, wherein:

the control part is configured to drive the motor at a first rotation speed when the handle is placed in a first position relative to the body housing, and to drive the motor at a second rotation speed higher than the first rotation speed when the handle moves forward from the first position to a second position relative to the body housing.

According to the present aspect, the motor can be prevented from being unnecessarily driven at high speed when the tool accessory is not striking the workpiece, so that vibration of the body housing can be suppressed. Further, according to the present aspect, by preventing the motor from being unnecessarily driven at high speed, consumption of the battery can be suppressed and available time (also called runtime), which is important for the battery-powered impact tool, can be improved.

In the present aspect, both the first rotation speed and the second rotation speed may be preset. Alternatively, both the first rotation speed and the second rotation speed may be set via an operation member which is operated by a user, or one of the rotation speeds may be set via the operation member and the other rotation speed may be accordingly set by the control part. Both the first rotation speed and the second rotation speed may be set to a larger value than zero.

In the present aspect, the control part need not always drive the motor at the second rotation speed higher than the first rotation speed after the handle relatively moves from the first position to the second position. Specifically, under certain conditions, the control part may allow the motor to continue driving at the first rotation speed even after the handle relatively moves to the second position. Such conditions may include a case in which the rotation speed set as the second rotation speed via the operation member is equal to or below the preset first rotation speed, or equal to or below the first rotation speed set via the operation member. In this case, the rotation speed set as the second rotation speed via the operation member may be used as the first rotation speed.

Aspect 9

The impact tool as defined in aspect 7 or 8, wherein the first detection part is disposed in the handle.

The handle is elastically connected to the body housing, so that transmission of vibration caused in the body housing to the handle can be suppressed. Therefore, by disposing the first detection part in the handle, the first detection part can be protected from vibration.

Aspect 10

The impact tool as defined in any one of aspects 7 to 9, wherein the control part is configured to immediately increase the rotation speed from the first rotation speed to the second rotation speed when the handle relatively moves from the first position to the second position.

According to the present aspect, the striking speed at which the tool accessory strikes the workpiece can immediately increase in response to the shift to the loaded state, so that working efficiency can be improved.

Aspect 11

The impact tool as defined in any one of aspects 7 to 9, wherein the control part is configured to gradually increase the rotation speed from the first rotation speed to the second rotation speed when the handle relatively moves from the first position to the second position.

According to the present aspect, the striking speed at which the tool accessory strikes the workpiece gradually can increase in response to the shift to the loaded state, so that excellent operation feeling can be provided to a user.

Aspect 12

The impact tool as defined in any one of aspects 7 to 11, wherein the first rotation speed is half the second rotation speed or below.

According to the present aspect, consumption of the battery in the unloaded state can be effectively suppressed.

Aspect 13

The impact tool as defined in any one of aspects 7 to 12, wherein the control part is configured to reduce the rotation speed from the second rotation speed to the first rotation speed when a specified time elapses after the handle relatively moves away from the second position toward the first position.

The specified time in the present aspect may be zero or longer than zero. The specified time may be preset and stored in a storage device at the time of factory shipment, or may be set via an operation member by a user. In a case where the specified time is zero, the control part can immediately reduce the rotation speed of the motor from the second rotation speed to the first rotation speed when the handle relatively moves from the second position to the first position. In this case, the control can be realized which is excellent in responsiveness to a release of the operation of pressing the tool accessory against the workpiece by a user. In the structure in which the handle is elastically connected to the body housing, however, the handle may be temporarily moved from the second position toward the first position relative to the body housing by vibration of the body housing. Therefore, in a case where the specified time is longer than zero, the control part can reduce the rotation speed of the motor by properly determining a relative movement of the handle which is caused not by such vibration but by a release of the operation of pressing the tool accessory against the workpiece.

Aspect 14

The impact tool as defined in any one of aspects 7 to 13, further comprising:

a second detection part configured to detect a movement of the body housing around the driving axis, wherein:

the driving mechanism is further configured to perform an operation of rotating the tool accessory around the driving axis by the power of the motor, and the second detection part is disposed in the handle.

When the tool accessory is rotationally driven, the body housing may be caused to excessively rotate around the driving axis, for example, by the tool accessory being locked into the workpiece. The second detection part may be used to detect such a so-called excessive rotation. The second detection part may be disposed in the handle in which vibration is reduced compared with the body housing, so that the second detection part can be protected from vibration. Further, the second detection part may of any type, as long as it is capable of detecting a movement of the body housing around the driving axis, and, for example, an acceleration sensor may be suitably adopted as the second detection part.

Aspect 15

The impact tool as defined in any one of aspects 7 to 14, wherein:

the driving mechanism further includes an idle-driving-prevention mechanism configured to prevent an idle driving operation, and the handle is configured to be placed in the second position at the same time when or after a function of preventing the idle driving operation is released in response to a push of the tool accessory into the body housing.

Preventing the idle driving operation in the present aspect may refer to preventing the operation of linearly driving the tool accessory in the unloaded state, and may be realized, for example, by impeding an operation of a portion of the driving mechanism. Any known structure may be adopted as the idle-driving-prevention mechanism. According to the present aspect, the operation of linearly driving the tool accessory can be immediately started when the rotation speed of the motor is increased to the second rotation speed, so that excellent working efficiency can be secured. It is noted that the timing control according to the present aspect may be typically realized by appropriately setting specifications (such as spring constant) of the elastic member.

Aspect 16

The impact tool as defined in aspect 7, further comprising:

a third detection part configured to detect a load on the tool accessory, wherein:

the control part is configured to control the rotation speed of the motor based on detection results of the first detection part and the third detection part, and the control part is configured to drive the motor at a first rotation speed when the handle is placed in a first position relative to the body housing and the load on the tool accessory does not exceed a threshold, and to drive the motor at a second rotation speed higher than the first rotation speed when the handle moves forward from the first position to a second position relative to the body housing or when the load on the tool accessory exceeds the threshold.

According to the present aspect, when the tool accessory is not striking the workpiece, the motor can be prevented from being unnecessarily driven at high speed, so that vibration of the body housing can be suppressed. Further, according to the present aspect, by preventing the motor from being unnecessarily driven at high speed, consumption of the battery can be suppressed and the available time (runtime), which is important for the battery-powered impact tool, can be improved. Moreover, by using the load which is separately detected by the third detection part, in addition to the relative position of the handle, the shift from the unloaded state to the loaded state can be more reliably detected in various operation states.

In the present aspect, both the first rotation speed and the second rotation speed may be preset. Alternatively, both of the first rotation speed and the second rotation speed may be set via an operation member which is operated by a user, or one of the rotation speeds may be set via the operation member and the other rotation speed may be accordingly set by the control part. Both the first rotation speed and the second rotation speed may be set to a larger value than zero. Further, the control part need not always drive the motor at the second rotation speed higher than the first rotation speed after the handle relatively moves from the first position to the second position. Specifically, under certain conditions, the control part may allow the motor to continue driving at the first rotation speed even after the handle relatively moves to the second position.

Aspect 17

The impact tool as defined in aspect 16, wherein the third detection part is configured to detect a driving current of the motor as the load.

It is known that the driving current of the motor increases as the load on the tool accessory increases. According to the present aspect, information of a different kind from the relative position of the handle can be detected with a simple structure and used as the load on the tool accessory.

Aspect 18

The impact tool as defined in aspect 16 or 17, wherein:

the motor is capable of driving at higher speed than the second rotation speed, and the control part is configured to drive the motor at a maximum rotation speed when the handle relatively moves from the first position to the second position and the load exceeds the threshold.

According to the present aspect, working efficiency can be maximized when the loaded state is more reliably determined from the detection results of the first and third detection parts.

Aspect 19

The impact tool as defined in any one of aspects 7 or 18, further comprising a battery removably mounted to the battery-mounting part.

Aspect 20

An upper end portion of the handle is connected to a rear end portion of the body housing via an elastic member so as to be movable relative to the body housing, a lower end portion of the handle is connected to the rear end portion of the body housing so as to be rotatable around a rotation axis relative to the body housing, the rotation axis extending in a left-right direction, and the first detection part is disposed in the upper end portion of the handle Aspect 21

The first detection part is disposed in the vicinity of the elastic member.

Aspect 22

The battery-mounting part is disposed in the handle.

The impact tool as defined in aspects 7 to 22 is not limited to the hammer drill 1 of the above-described embodiment. For example, the following modifications may be made. Further, one or more of these modifications may be employed in combination with any one of the hammer drill 1 of the above-described embodiment, its modifications and the impact tool as defined in each of these aspects.

In the above-described embodiment, the hammer drill 1 is described as an example of the impact tool configured to linearly drive the tool accessory 91, but the aspects 7 to 22 can also be applied to other impact tools (such as an electric hammer). The structures and arrangement relations of the motor 2, the driving mechanism 3, the body housing that houses the motor 2 and the driving mechanism 3, and the handle 15 including the grip part 16 may be appropriately modified or changed according to the impact tool.

The structure of elastically connecting the body housing 10 and the handle 15 may be appropriately changed. For example, the upper and lower end portions of the handle 15 may be connected to the body housing 10 via one or more elastic members so as to be movable in the driving-axis-A1 direction (front-rear direction). Alternatively, only the upper end portion of the handle 15 may be elastically connected to the body housing 10 in a cantilever manner. Further, the elastic member is not limited to the compression coil spring, but a different kind of spring, rubber or synthetic resin may be employed. It may be preferable that the position sensor 45 is disposed in the vicinity of the elastic member, but the position sensor 45 may be disposed elsewhere, in the upper end portion or the lower end portion of the handle 15. Alternatively, the position sensor 45 may be disposed on the body housing 10 side.

The battery-mounting part 171 may be provided not on the handle 15 but on the body housing 10. Further, a plurality of batteries can be mounted to the impact tool.

The position sensor 45 may be changed to any other detection mechanism, as long as it is capable of detecting the position of the handle 15 relative to the body housing 10. For example, a sensor of a non-contact type (such as an optical type) other than the magnetic field detection type or a contact type detection mechanism (such as a mechanical switch) may be adopted.

The acceleration sensor unit 47 may be omitted. Further, the acceleration sensor unit 47 may be disposed not in the handle 15 but in the body housing 10. The acceleration sensor unit 47 may preferably be disposed as far away from the driving axis A1 as possible, in order to properly detect a movement of the body housing 10 around the driving axis A1.

The content of soft-no-load control of the above-described embodiment may be appropriately changed. For example, the ratio of the first rotation speed to the second rotation speed may be set to other than one half. Further, both the first rotation speed and the second rotation speed may be preset or may be set via the speed-change dial unit 43 or other operation members.

The controller 41 may use a preset rotation speed (referred to as a no-load rotation speed) as the first rotation speed and use a rotation speed set with the speed-change dial unit 43 as the second rotation speed. When the rotation speed set with the speed-change dial unit 43 is equal to or below the no-load rotation speed, the controller 41 may use the rotation speed set with the speed-change dial unit 43 as the first rotation speed, and continue driving at the first rotation speed while the switch 163 is in the ON state, regardless of the relative position of the handle 15. Further, the controller 41 may use the rotation speed set with the speed-change dial unit 43 as the rotation speed corresponding to the maximum amount of depressing operation of the trigger 161, and change the rotation speed according to the amount (percentage) of the depressing operation of the trigger 161. In this case, in the unloaded state, the controller 41 may drive the motor 2 at the rotation speed corresponding to the amount of the depressing operation when it is equal to or below the no-load rotation speed, and drive the motor 2 at the no-load rotation speed when the rotation speed corresponding to the amount of the depressing operation exceeds the no-load rotation speed. In other words, in any case, in the unloaded state, the controller 41 may control the rotation speed of the motor 2 not to exceed the no-load rotation speed.

In the above-described embodiment, the controller 41 returns (reduces) the rotation speed of the motor 2 to the first rotation speed when a specified time (longer than zero) elapses after the upper connection part 19 moves rearward from the OFF position toward the rearmost position. However, the controller 41 may immediately return the rotation speed of the motor 2 to the first rotation speed when the upper connection part 19 moves rearward from the OFF position toward the rearmost position. In other words, the specified time may be zero. In this case, the control can be realized which is excellent in responsiveness to a release of the operation of pressing the tool accessory against the workpiece by a user. Further, the specified time may be preset and stored in the ROM or other nonvolatile memory at the time of factory shipment, or may be set via some operation member by a user.

In the above-described embodiment, the controller 41 is formed by a microcomputer including the CPU, but may be formed, for example, by a programmable logic device such as ASIC (Application Specific Integrated Circuits) and FPGA (Field Programmable Gate Array). The driving control processing in the above-described embodiment and its modifications may be distributed to a plurality of control circuits.

Correspondences between the features of the above-described embodiment and the features of aspects 7 to 22 are as follows. However, these correspondences given here are non-limiting examples. The hammer drill 1 is an example that corresponds to the "impact tool". The motor 2 is an example that corresponds to the "motor". The driving mechanism 3 is an example that corresponds to the "driving mechanism". The driving axis A1 is an example that corresponds to the "driving axis". The tool accessory 91 is an example that corresponds to the "tool accessory". The body housing 10 is an example that corresponds to the "body housing". The handle 15, the grip part 16 and the elastic member 191 are examples that correspond to the "handle", the "grip part" and the "elastic member", respectively. The battery-mounting part 171 and the battery 93, 930 are examples that correspond to the "battery-mounting part" and the "battery", respectively. The position sensor 45 is an example that corresponds to the "first sensor". The controller (CPU) 41 is an example that corresponds to the "control part". The rearmost position of the handle 15 is an example that corresponds to the "first position". The OFF position of the handle 15 is an example that corresponds to the "second position". The acceleration sensor unit 47 is an example that corresponds to the "second sensor". The idle-driving-prevention mechanism 38 is an example that corresponds to the "idle-driving-prevention mechanism". The current detection amplifier 425 is an example that corresponds to the "third detection part".

DESCRIPTION OF NUMERALS

1: hammer drill, 10: body housing, 11: driving-mechanism-housing part, 111: support wall, 113: stopper part, 12: motor-housing part, 121: protruding part, 123: opening, 15: handle, 16: grip part, 161: trigger, 163: switch, 17: controller-housing part, 171: battery-mounting part, 172: guide rail, 173: recess, 18: lower connection part, 181: shaft part, 183: recess, 185: elastic member, 19: upper connection part, 190: spring-receiving part, 191: elastic member, 193: elongate hole, 2: motor, 20: motor body, 21: stator, 23: rotor, 25: motor shaft, 26: small bevel gear, 3: driving mechanism, 30: motion-converting mechanism, 31: intermediate shaft, 311: large bevel gear, 32: rotary body, 33: swinging member, 34: sleeve, 35: piston cylinder, 36: striking mechanism, 361: striker, 363: impact bolt, 37: rotation-transmitting mechanism, 38: idle-driving-prevention mechanism, 381: holding member, 383: O-ring, 39: tool holder, 41: controller, 421: three phase inverter, 423: Hall sensor, 425: current detection amplifier, 43: speed-change dial unit, 45: position sensor, 450: board, 46: magnet, 47: acceleration sensor unit, 49: wireless adapter, 490: adapter-mounting part, 491: housing part, 492: insertion port, 493: cap, 91: tool accessory, 93: battery, 930: battery, 932: guide groove, 933: hook, 95: auxiliary handle, A1: driving axis, A2: rotation axis, G: center of gravity

What is claimed is:

1. An impact tool, comprising:
- a motor;
- a driving mechanism configured to linearly drive a tool accessory along a driving axis by power of the motor, the driving axis extending in a front-rear direction of the impact tool;
- a body housing that houses the motor and the driving mechanism;
- a handle connected to the body housing via an elastic member to be movable relative to the body housing, the handle including a grip part configured to be held by a user;
- a position detection device configured to detect when the handle is in different positions relative to the body housing; and
- a control device configured to control rotation speed of the motor based on a position detection result of the position detection device, wherein:
- the control device is configured to drive the motor (i) at a first rotation speed when the position detection device detects that the handle is in a first rearward position relative to the body housing and (ii) at a second rotation speed higher than the first rotation speed when the position detection device detects that the handle has moved to a second position relative to the body housing from the first rearward position, the second position being forward of the first rearward position; and
- the control device is configured to reduce the rotation speed from the second rotation speed to the first rotation speed when a specified time elapses after the handle moves from the second position toward the first rearward position.

2. The impact tool as defined in claim 1, wherein a distance between the grip part and the body housing in the front-rear direction when the handle is in the second position is shorter than a distance between the grip part and the body housing in the front-rear direction when the handle is in the first rearward position.

3. The impact tool as defined in claim 1, wherein the control device is configured to immediately increase the rotation speed from the first rotation speed to the second rotation speed in a step manner when the handle moves to the second position from the first rearward position.

4. The impact tool as defined in claim 1, wherein the control device is configured to gradually increase the rotation speed from the first rotation speed to the second rotation speed over time in a ramp manner when the handle moves to the second position from the first rearward position.

5. The impact tool as defined in claim 1, wherein the first rotation speed is half the second rotation speed or below.

6. The impact tool as defined in claim 1, wherein the control device is configured to drive the motor at (i) the first rotation speed when the grip part and the body housing are apart from each other by at least a first distance and (ii) the second rotation speed when the grip part and the body housing are apart from each other by a second distance shorter than the first distance.

7. An impact tool, comprising:
- a motor;
- a driving mechanism configured to linearly drive a tool accessory along a driving axis by power of the motor, the driving axis extending in a front-rear direction of the impact tool;
- a body housing that houses the motor and the driving mechanism;
- a handle connected to the body housing via an elastic member to be movable relative to the body housing, the handle including a grip part configured to be held by a user;
- a first detection device configured to detect a position of the handle relative to the body housing; and
- a control device configured to control rotation speed of the motor based on a detection result of the first detection device,
- wherein the first detection device is a magnetic field sensor.

8. The impact tool as defined in claim 7, wherein the first detection device is in the handle.

9. The impact tool as defined to claim 7, further comprising:
- a second detection device configured to detect a load on the tool accessory,
- wherein the control device is configured to drive the motor (i) at a first rotation speed when the first detection device detects that the handle is in a first rearward position relative to the body housing and the load on the tool accessory detected by the second detection device does not exceed a threshold, (ii) at a second rotation speed higher than the first rotation speed when the first detection device detects that the handle has moved to a second position relative to the body housing from the first rearward position, the second position being forward of the first rearward position, and (iii) at the second rotation speed when the load on the tool accessory detected by the second detection device exceeds the threshold.

10. The impact tool as defined in claim 9, wherein the second detection device is configured to detect a driving current of the motor as the load.

11. The impact tool as defined in claim 9, wherein:
- the motor is capable of driving at a maximum rotation speed that is higher than the second rotation speed, and the control device is configured to drive the motor at the maximum rotation speed when the handle is in the second position and the load exceeds the threshold.

12. The impact tool as defined in claim 7, further comprising a battery-mounting part configured to removably receive a battery, the battery being a power source of the motor.

13. The impact tool as defined in claim 12, further comprising a battery removably mounted to the battery-mounting part.

14. An impact tool, comprising:

a motor;

a driving mechanism configured to linearly drive a tool accessory along a driving axis by power of the motor, the driving axis extending in a front-rear direction of the impact tool;

a body housing that houses the motor and the driving mechanism;

a handle connected to the body housing via an elastic member to be movable relative to the body housing, the handle including a grip part configured to be held by a user;

a first detection device configured to detect a position of the handle relative to the body housing;

a control device configured to control rotation speed of the motor based on a detection result of the first detection device; and a second detection device, wherein:

the driving mechanism is further configured to rotate the tool accessory around the driving axis by the power of the motor, the second detection device is configured to detect movement of the body housing around the driving axis, and the second detection device is in the handle.

15. An impact tool, comprising:

a motor;

a driving mechanism configured to linearly drive a tool accessory along a driving axis by power of the motor, the driving axis extending in a front-rear direction of the impact tool;

a body housing that houses the motor and the driving mechanism;

a handle connected to the body housing via an elastic member to be movable relative to the body housing, the handle including a grip part configured to be held by a user;

a first detection device configured to detect a position of the handle relative to the body housing; and a control device configured to control rotation speed of the motor based on a detection result of the first detection device, wherein the driving mechanism includes an idle-driving-prevention mechanism configured to prevent an idle driving operation, and the handle is configured to be placed in the second position at the same time when or after a function of preventing the idle driving operation is released in response to a push of the tool accessory into the body housing.

16. An impact tool, comprising:

a motor;

a driving mechanism configured to linearly drive a tool accessory along a driving axis by power of the motor, the driving axis extending in a front-rear direction of the impact tool;

a body housing that houses the motor and the driving mechanism;

a handle connected to the body housing via an elastic member to be movable relative to the body housing, the handle including a grip part configured to be held by a user;

a position detection device configured to detect when the handle is in different positions relative to the body housing; and a control device configured to control rotation speed of the motor based on a position detection result of the position detection device, wherein:

the control device is configured to drive the motor (i) at a first rotation speed when the position detection device detects that the handle is in a first rearward position relative to the body housing and (ii) at a second rotation speed higher than the first rotation speed when the position detection device detects that the handle has moved to a second position relative to the body housing from the first rearward position, the second position being forward of the first rearward position;

the control device is configured to drive the motor at (i) the first rotation speed when the grip part and the body housing are apart from each other by at least a first distance and (ii) the second rotation speed when the grip part and the body housing are apart from each other by a second distance shorter than the first distance; and the first detection device is a magnetic field sensor in the handle.

* * * * *